(12) United States Patent
Dougherty et al.

(10) Patent No.: US 8,704,705 B2
(45) Date of Patent: Apr. 22, 2014

(54) RADAR APPARATUS CALIBRATION VIA INDIVIDUAL RADAR COMPONENTS

(75) Inventors: John Charles Dougherty, Liverpool, NY (US); Jeffrey John Fontanella, Liverpool, NY (US)

(73) Assignee: SRC, Inc., North Syracuse, NY (US)

( * ) Notice: Subject to any disclaimer, the term of this patent is extended or adjusted under 35 U.S.C. 154(b) by 479 days.

(21) Appl. No.: 13/049,213

(22) Filed: Mar. 16, 2011

(65) Prior Publication Data

US 2012/0235858 A1    Sep. 20, 2012

(51) Int. Cl.
*G01S 7/40* (2006.01)

(52) U.S. Cl.
USPC .......................................................... 342/169

(58) Field of Classification Search
USPC .................................................. 342/165–174
See application file for complete search history.

(56) References Cited

U.S. PATENT DOCUMENTS

| | | | |
|---|---|---|---|
| 4,283,729 A | | 8/1981 | Richardson |
| 4,675,678 A | | 6/1987 | Klingenschmitt et al. |
| 5,017,927 A | | 5/1991 | Agrawal et al. |
| 5,081,460 A | * | 1/1992 | Liu ................................ 342/169 |
| 5,274,384 A | | 12/1993 | Hussain et al. |
| 5,276,452 A | | 1/1994 | Schuss et al. |
| 5,371,506 A | | 12/1994 | Yu et al. |
| 5,412,414 A | | 5/1995 | Ast et al. |
| 5,477,229 A | | 12/1995 | Caille et al. |
| 5,510,796 A | | 4/1996 | Applebaum |
| 5,839,096 A | * | 11/1998 | Lyons et al. ................... 702/183 |
| 5,847,673 A | | 12/1998 | DeBell |
| 5,864,317 A | | 1/1999 | Boe et al. |
| 6,157,343 A | * | 12/2000 | Andersson et al. ........... 342/371 |
| 6,236,839 B1 | | 5/2001 | Gu et al. |
| 6,339,399 B1 | * | 1/2002 | Andersson et al. ........... 342/372 |
| 6,483,478 B2 | | 11/2002 | Yu et al. |

(Continued)

FOREIGN PATENT DOCUMENTS

| | | |
|---|---|---|
| CN | 101588198 A | 11/2009 |
| FR | 2750209 A | 12/1997 |
| GB | 2219471 A | 12/1989 |
| GB | 2467773 A | 8/2010 |

OTHER PUBLICATIONS

Alexander, "Using the calculable dipole antenna for antenna calibration and validation of EMC test sites", 2010 Asia-Pacific International Symposium on Electromagnetic Compatibility (APEMC) [Online] 2010 pp. 782-785.

(Continued)

*Primary Examiner* — Matthew M Barker
(74) *Attorney, Agent, or Firm* — George R. McGuire; Bond Schoeneck & King, PLLC

(57) ABSTRACT

A method, system and computer program product for calibrating and operating a radar apparatus provides for obtaining calibration response data from, for example, a radar cylinder and a plurality of radar columns, prior to assembling the radar cylinder and plurality of radar columns into an assembled radar apparatus. The calibration response data for the exemplary radar cylinder and the plurality of radar columns is evaluated to provide a simulated response of the assembled radar apparatus. Actual measured responses from the assembled radar apparatus may then be correlated with the simulated response through use of a look-up table. The particular method, system and program product for calibrating and operating the radar apparatus provides for avoidance of field calibration of the assembled radar apparatus, which is generally neither desirable nor feasible under hostile conditions.

22 Claims, 22 Drawing Sheets

(56) References Cited

U.S. PATENT DOCUMENTS

| | | |
|---|---|---|
| 6,492,942 B1 | 12/2002 | Kezys |
| 6,598,009 B2 | 7/2003 | Yang |
| 6,697,009 B2 | 2/2004 | Yu |
| 6,720,910 B2 | 4/2004 | Yu |
| 6,771,216 B2 | 8/2004 | Patel et al. |
| 6,806,837 B1 | 10/2004 | Saucier et al. |
| 6,833,812 B2 | 12/2004 | Diament |
| 6,844,849 B1 | 1/2005 | Barrick et al. |
| 6,867,726 B1 | 3/2005 | Yu et al. |
| 7,068,218 B2 | 6/2006 | Gottl et al. |
| 7,119,739 B1 | 10/2006 | Struckman |
| 7,215,298 B1 | 5/2007 | Fraschilla et al. |
| 7,248,210 B2 | 7/2007 | Bruce et al. |
| 7,443,359 B2 | 10/2008 | Brune et al. |
| 7,446,728 B2 | 11/2008 | Li |
| 7,482,976 B2 | 1/2009 | Plesinger |
| 7,576,682 B1 | 8/2009 | Yu |
| 7,623,062 B2 | 11/2009 | Ding |
| 7,671,799 B1 | 3/2010 | Paek et al. |
| 7,683,842 B1 | 3/2010 | Engel et al. |
| 7,714,776 B2 | 5/2010 | Cooper et al. |
| 7,714,782 B2 | 5/2010 | Davis et al. |
| 7,782,250 B2 * | 8/2010 | Shih et al. .......... 342/172 |
| 7,786,933 B2 | 8/2010 | Chang |
| 2005/0159187 A1 | 7/2005 | Mendolia et al. |
| 2006/0055592 A1 | 3/2006 | Leather et al. |
| 2008/0129613 A1 | 6/2008 | Ermutlu et al. |
| 2009/0309786 A1 | 12/2009 | Stolpman et al. |
| 2010/0121318 A1 | 5/2010 | Hancock et al. |
| 2010/0123617 A1 | 5/2010 | Yu et al. |

OTHER PUBLICATIONS

Betta et al. "Calibration of Antenna for EMI Measurements in Compact Semi-anechoic Rooms.", 16th IMEKO TC4 Symposium [Online] 2008.

Dandekar et al., "Smart Antenna Array Calibration Procedure Including Amplitude and Phase Mismatch and Mutual Coupling Effects." 2000 IEEE International Conference on Personal Wireless Communications [Online] 2000.

Dominguez-Grano De Oro et al., "Monopulse Scanning Beam Planar Array for Signal Identification System." First European Conference on Antennas and Propagation [Online] 2006.

Garn et al., "Primary Standards for Antenna Factor Calibration in the Frequency Range of (30 to 1000) MHz." IEEE Transactions on Instrumentation and Measurement [Online] Apr. 1997, vol. 46, Issue 2, pp. 544-548.

Hazdra et al., "Microwave Antennas and Circuits Modeling Using Electromagnetic Field Simulator." Radioengineering [Online] 2005, vol. 14, No. 4, pp. 2-10.

Hu et al., "Electronically Reconfigurable Monopulse Reflectarray Antenna With Liquid Crystal Substrate." The Second European Conference on Antennas and Propagation [Online] 2007.

Kim et al., "Precise Phase Calibration of a Controlled Reception Pattern GPS Antenna for JPALS." Position Location and Navigation Symposium [Online] 2004.

Moon et al., "Monopulse Angle Estimation With Constrained Adaptive Beamforming Using Simple Mainlobe Maintenance Technique." IEEE Military Communications Conference [Online] 2003.

"Planar Antenna Simulation in AXIEM." http://web.awrcorp.com/content/Downloads/MWJ-AXIEM-July-2010.pdf (accessed Sep. 7, 2010).

Spong "An Efficient Method for Computing Aximuth and Elevation Angle Estimates from Monopulse Ratio Measurements of a Phased Array Pencil Beam Radar with Two-Dimensional Angle Steering." The Record of the 1999 IEEE Radar Conference [Online] 1999, pp. 309-314.

Takamizawa, "Analysis of Highly Coupled Wideband Antenna Arrays Using Scattering Parameter Network Models." Dissertation for Doctor of Philosophy in Electrical Engineering in Virginia Polytechnic Institute and State University [Online] 2002.

Yamada et al., "Mutual Impedance of Receiving Array and Calibration Matrix for High-resolution DOA Estimation." IEEE/ACES International Conference on Wireless Communications and Applied Computational Electromagnetic [Online] 2005.

* cited by examiner

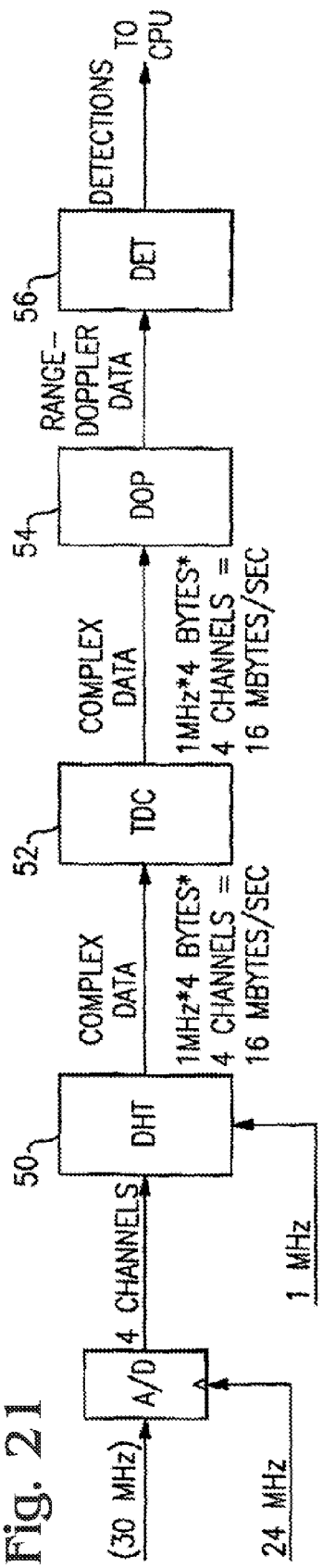
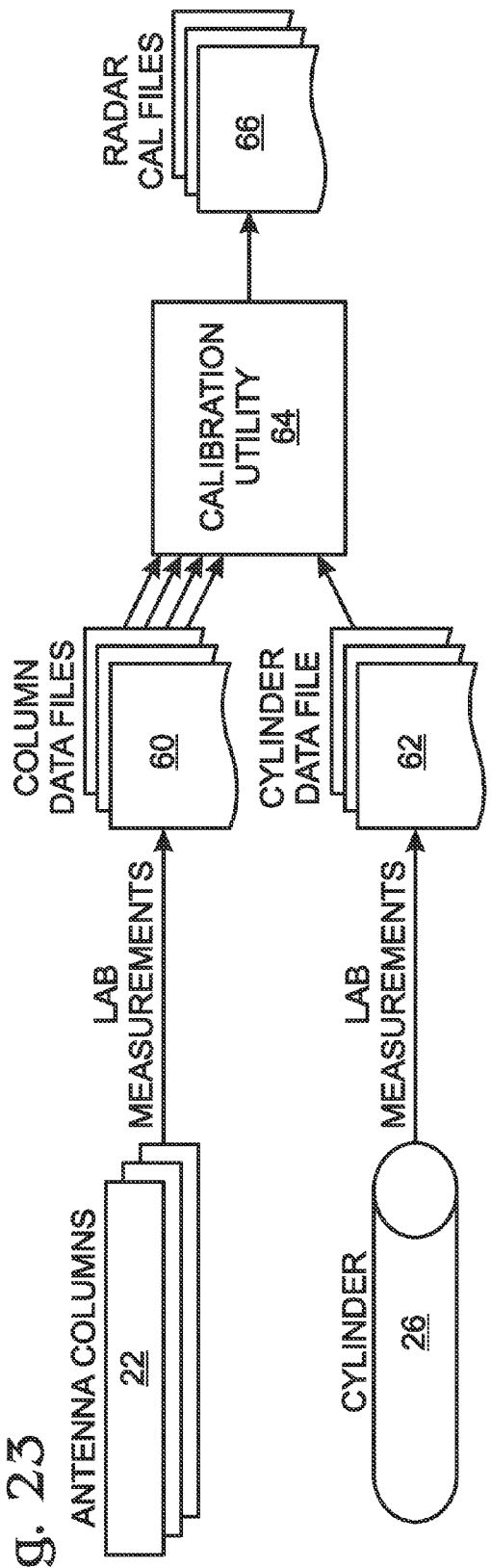

Fig. 24
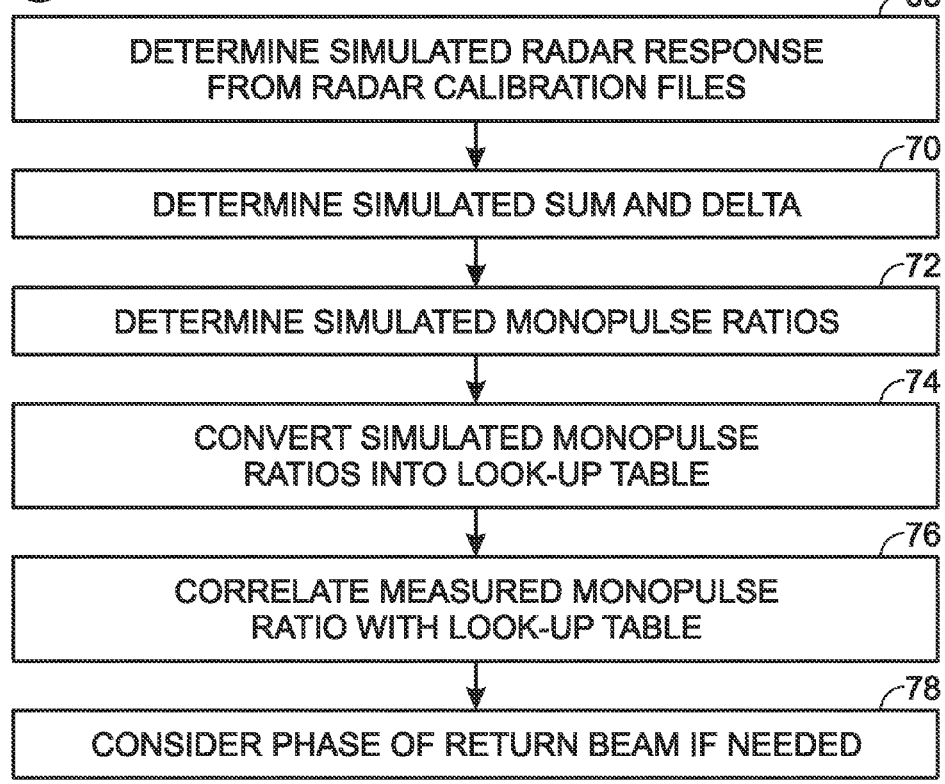
Fig. 25 EXAMPLE (V)3 UPPER ANTENNA PATTERN
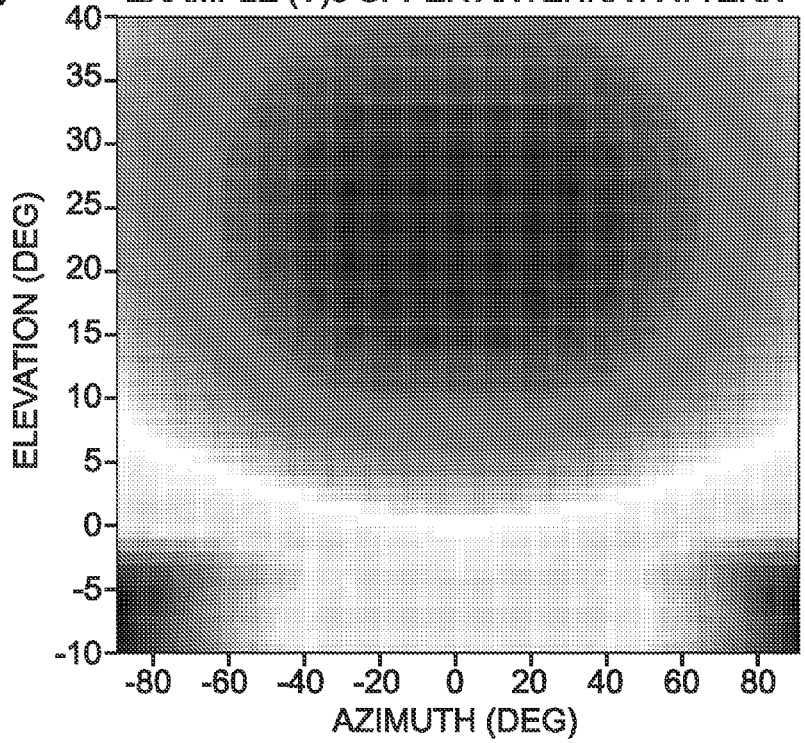

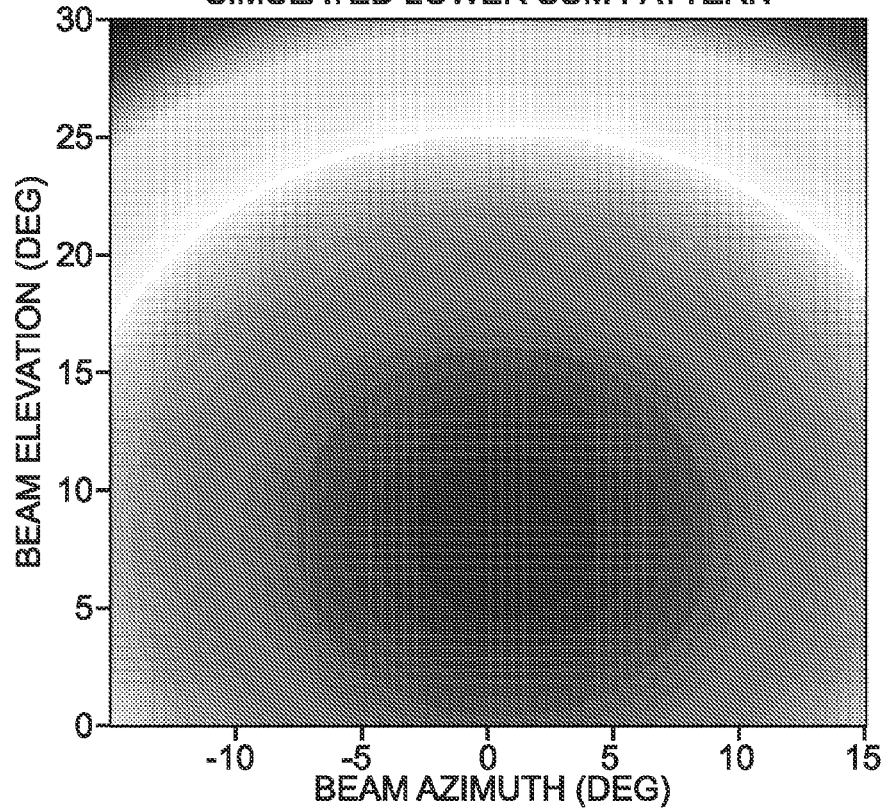
Fig. 26 SIMULATED LOWER SUM PATTERN
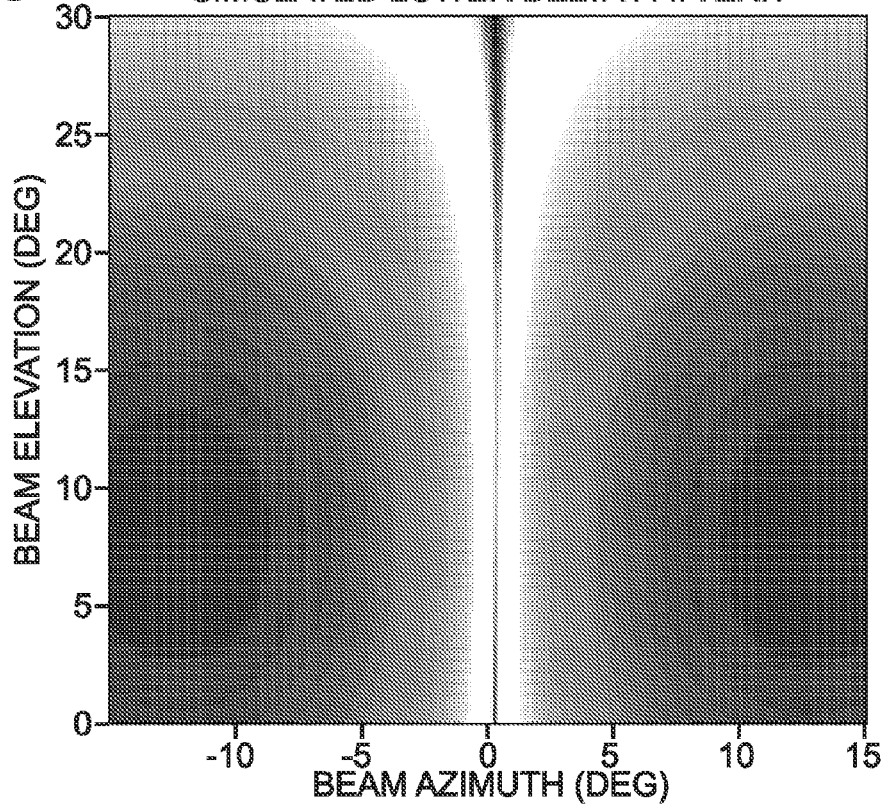
Fig. 27 SIMULATED LOWER DELTA PATTERN Fig. 30 EXAMPLE POSSIBLE Az/El POINTS BASED ON RECEIVED MAGNITUDE RATIOS
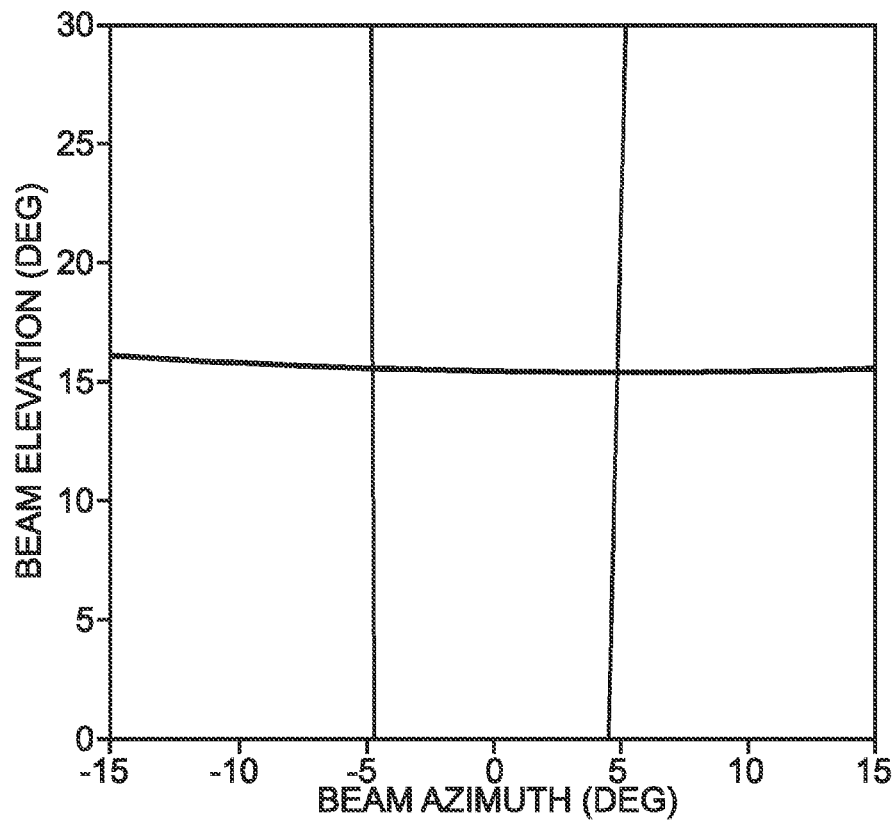
Fig. 31
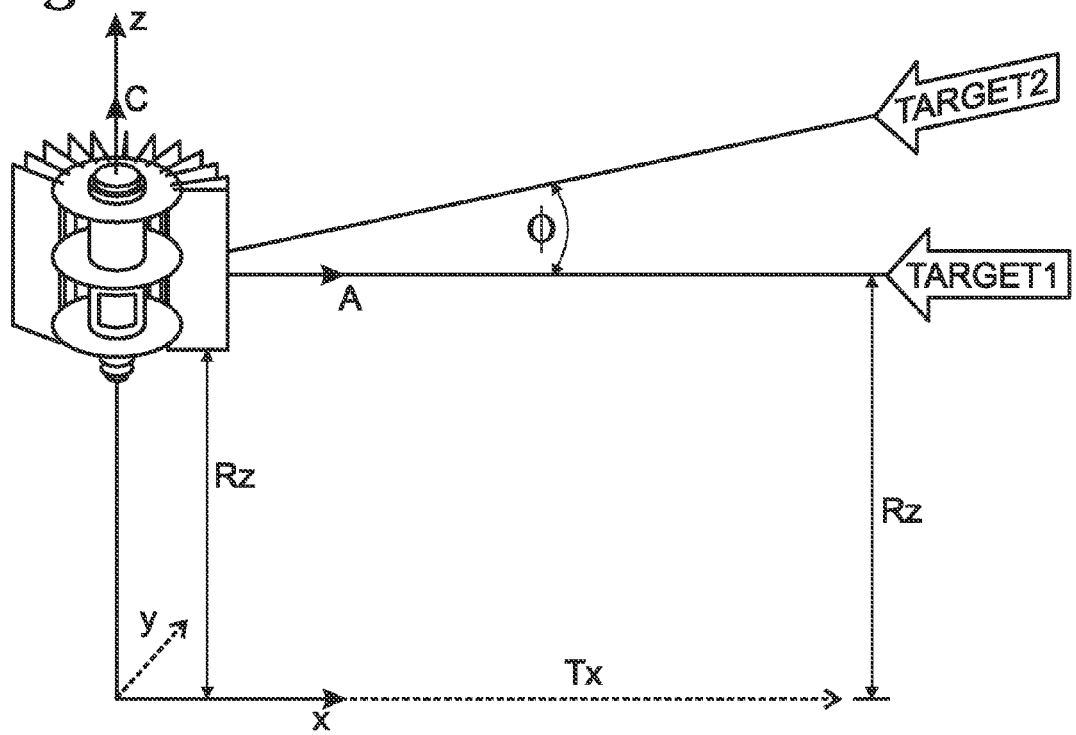

RADAR APPARATUS CALIBRATION VIA INDIVIDUAL RADAR COMPONENTS

STATEMENT OF GOVERNMENT INTEREST

This work was funded under U.S. Government contract N15P7T-05-C-P004. The U.S. Government may have rights in this invention.

CROSS-REFERENCE TO RELATED APPLICATION

This application is related to application Ser. No. 13/025,652, filed Feb. 11, 2011, and titled Bench-Top Measurement Method, Apparatus and System for Phased Array Radar Apparatus Calibration, the contents of which is incorporated herein fully by reference.

BACKGROUND OF THE INVENTION

1. Field of the Invention

The invention relates generally to radar apparatus. More particularly, the invention relates to methods for calibrating and operating radar apparatus.

2. Description of the Related Art

Radar apparatus are well known and well utilized in both commercial applications and military applications, where it is desirable to map (i.e., locate) and track a particular target within a particular field. Radar apparatus effect such a mapping and tracking of the particular target within the particular field by a detection of reflected radio waves in comparison with emitted radio waves.

While radar apparatus are thus particularly common and quite desirable within commercial applications and military applications, radar apparatus are nonetheless not entirely without problems.

In that regard, radar apparatus, like many other electronic components and apparatus, often require an external and routine calibration in order to assure that the radar scans that are obtained when using a radar apparatus are accurately representative of the location and trajectory of a particular target within a particular field. Unfortunately, radar apparatus when deployed within the context of certain military applications may not be amenable or readily accessible to such external and routine calibration.

Thus, desirable are additional systems and methods for calibrating radar apparatus to assure that radar apparatus accuracy is efficiently optimized with respect to detecting and tracking targets and trajectories within particular fields, and under various radar apparatus installation conditions.

SUMMARY

The embodiments include a method for calibrating and operating a radar apparatus and a system for calibrating and operating the radar apparatus. The embodiments also include a computer program product that relates to the foregoing method and system. The particular method, system and computer program product in accordance with the embodiments is predicated upon testing and calibration of individual radar apparatus components prior to assembly and operation of a radar apparatus that comprises the individual radar apparatus components. Thus, the pretested and precalibrated radar apparatus components may be directly assembled to provide a fully calibrated radar apparatus absent a need for testing and calibrating the radar apparatus after assembly in a field environment, such as in particular a hostile field environment.

A particular method for operating a radar apparatus in accordance with the invention includes determining for a plurality of radar components a plurality of laboratory test electrical responses. This particular method also includes determining from the plurality of laboratory test electrical responses a simulated radar response for an assembled radar apparatus assembled from the plurality of radar components. This particular method also includes assembling the plurality of radar components to provide the assembled radar apparatus. This particular method also includes determining the location of a target by correlating a measured response of the assembled radar apparatus with the simulated radar response.

Another particular method for operating a radar apparatus in accordance with the invention includes determining a radar cylinder electrical response for an individual radar cylinder in a test fixture. This other particular method also includes determining a plurality of radar column electrical responses for each of a plurality of individual radar columns in a test fixture. This other particular method also includes determining from the radar cylinder electrical response and the plurality of radar column electrical responses a simulated radar response for an assembled radar apparatus assembled from the radar cylinder and the plurality of radar columns.

This other particular method also includes assembling the individual radar column and the plurality of radar columns to provide the assembled radar apparatus. This other particular method also includes determining the location of a target by correlating a measured response of the assembled radar apparatus with the simulated radar response.

A particular radar system in accordance with the invention includes: (1) a radar apparatus comprising a plurality of components; and (2) a computer programmed to: (a) receive for the plurality of components a plurality of laboratory test electrical responses; (b) determine from the plurality of laboratory test electrical responses a simulated radar response for an assembled radar apparatus assembled from the plurality of radar components; and (c) determine the location of a target by correlating a measured response of the assembled radar apparatus with the simulated radar response.

A particular computer program product in accordance with the invention includes a tangible medium encoded to: (1) receive for a plurality of radar components a plurality of laboratory test electrical responses; (2) determine from the plurality of laboratory test electrical responses a simulated radar response for an assembled radar apparatus assembled from the plurality of radar components; and (3) determine the location of a target by correlating a measured response of the assembled radar apparatus with the simulated radar response.

BRIEF DESCRIPTION OF THE DRAWINGS

The objects, features and advantages of the invention are understood within the context of the Detailed Description of the Embodiments, as set forth below. The Detailed Description of the Embodiments is understood within the context of the following drawings, that form a material part of this disclosure, wherein:

FIG. 21 is a block diagram of the firmware of a digital signal processor according to the embodiments.

FIG. 23 is a block diagram illustrating determination of radar calibration files according to the embodiments.

FIG. 24 is a block diagram illustrating determination of a target location according to the embodiments.

FIG. 25 is a simulation of an upper antenna pattern according to the embodiments.

FIG. 26 is a simulation of a lower sum pattern according to the embodiments.

FIG. 27 is a simulation of a lower delta pattern according to the embodiments.

FIG. 30 is a simulated graph of beam azimuth versus beam elevation illustrating multiple intersection points according to the embodiments.

FIG. 31 is an isometric-view diagram of a partially assembled radar apparatus illustrating geometric parameters according to the embodiments.

DETAILED DESCRIPTION OF THE EMBODIMENTS

The embodiments, which provide a method for calibrating and operating a radar apparatus and a system for calibrating and operating the radar apparatus, as well as a related computer program product, are understood within the context of the description set forth below. The description set forth below is understood within the context of the drawings described above. Since the drawings are intended for illustrative purposes, the drawings are not necessarily drawn to scale.

The particular method, system and program product in accordance with the embodiments provide that individual radar apparatus components are independently tested prior to assembly to provide radar component test performance data files (i.e., typically but not necessarily limited to cylinder test performance data files and column test performance data files) that are inputted to a calibration utility (i.e., a software program) that provides calibration files that are used for calibrating the radar apparatus that is subsequently assembled from the individual radar apparatus components. Such precalibration of radar apparatus components is desirable under circumstances where a radar apparatus is deployed in a hostile environment, and radar apparatus post assembly calibration may be neither desirable nor feasible.

The following description will first describe a particular exemplary non-limiting radar apparatus that may be calibrated and operated in accordance with the embodiments. The following description will next describe a particular calibration and operation methodology of that particular non-limiting radar apparatus in accordance with the embodiments.

Exemplary Non-limiting Radar Apparatus

Figure 1:
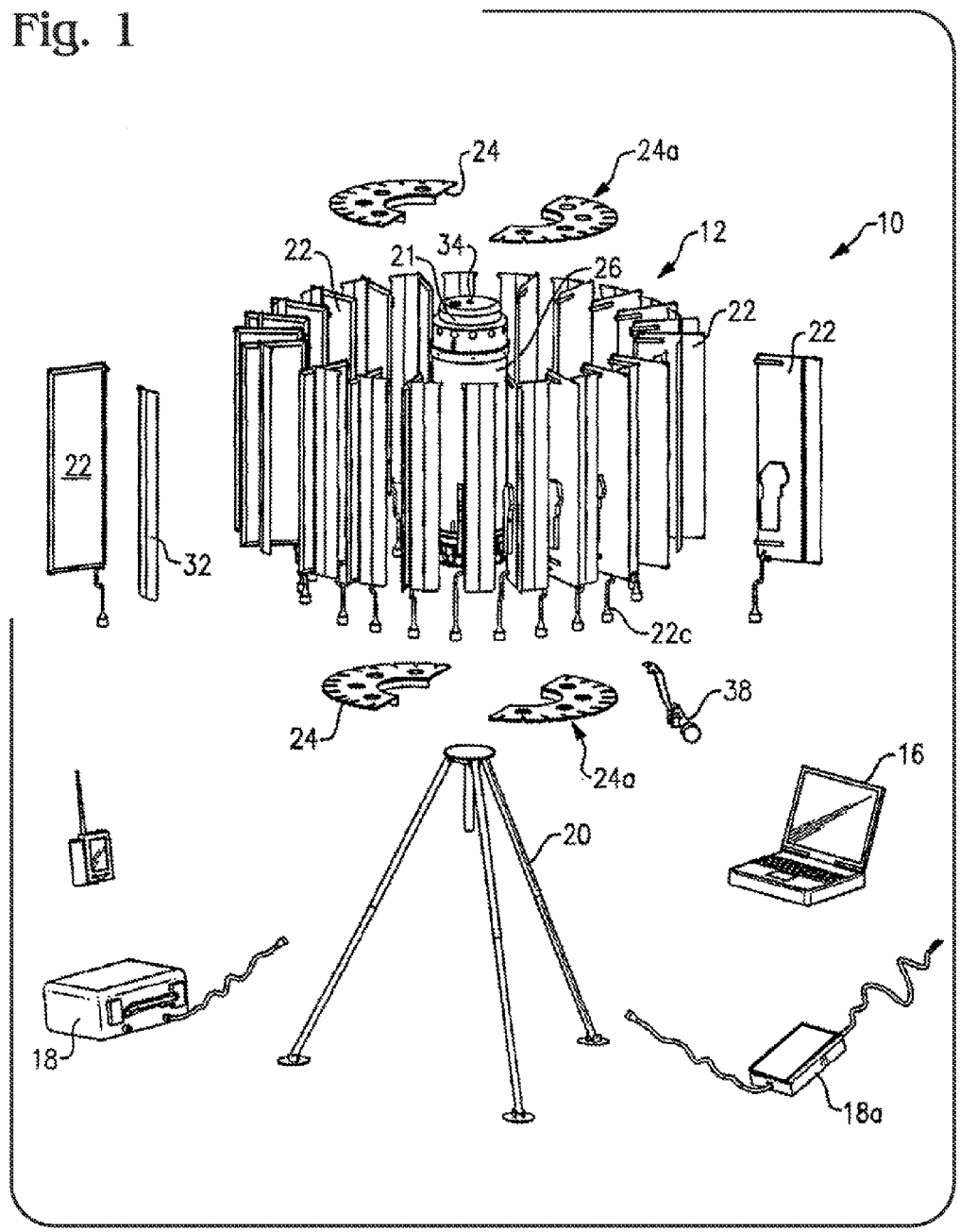
FIG. 1 is an exploded perspective view of a radar apparatus according to the embodiments.

Referring now to the drawings, wherein like numerals refer to like parts throughout, there is seen in FIG. 1 radar apparatus 10 within the context of which may be practiced the embodiments and the invention. Radar apparatus 10 that is generally illustrated in FIG. 1 may optionally be designated as Manportable Counter-Mortar Radar (MCMR) or Lightweight Counter-Mortar Radar (LCMR). Radar apparatus 10 generally comprises an antenna 12 that further comprises a plurality of additional component parts. As is illustrated in FIG. 1, antenna 12 is positioned upon tripod 20. Radar apparatus 10 also includes laptop computer 16 (to provide at least in-part a radar system in accordance with the embodiments) and power supply 18 or 18a.

Figure 2:
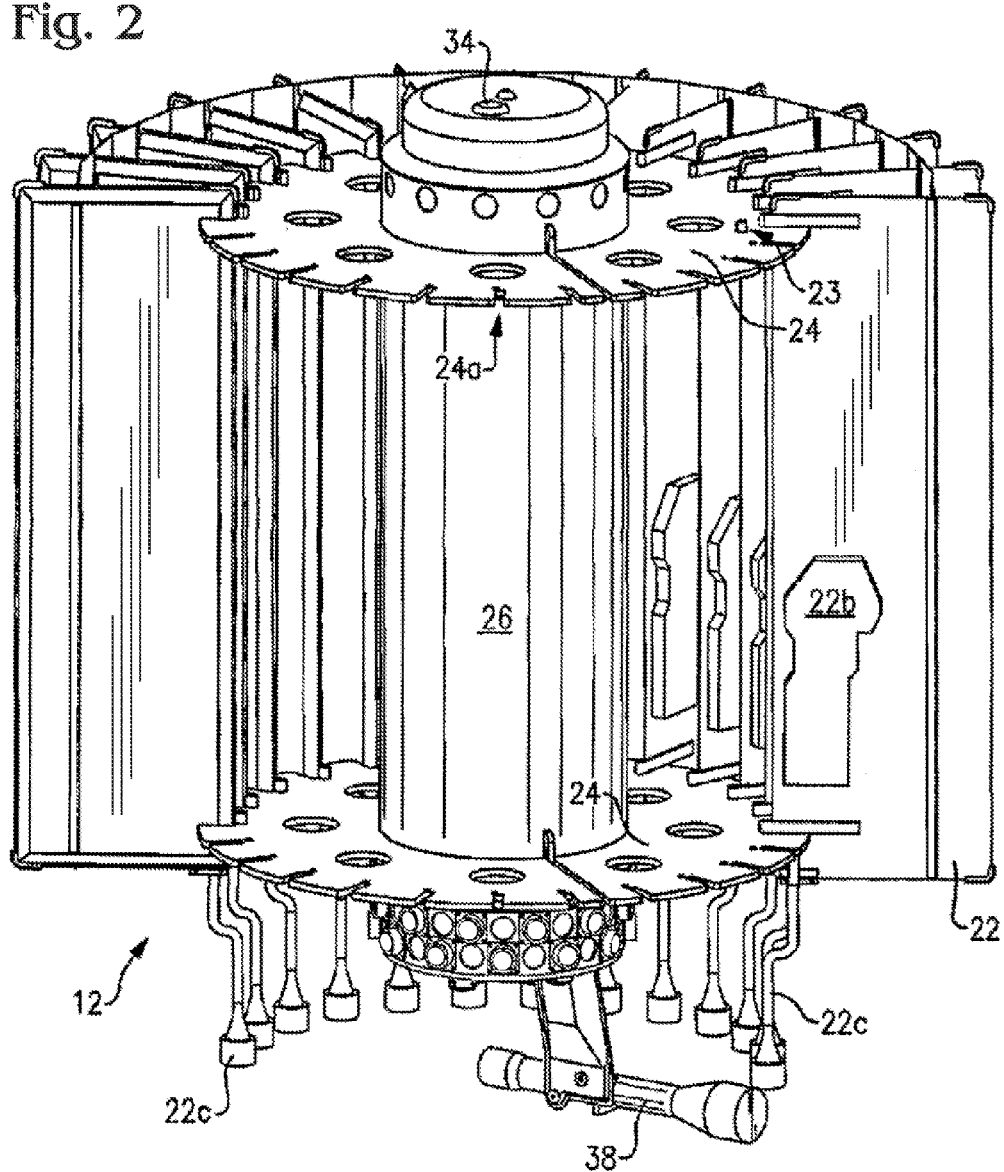
FIG. 2 is a perspective cutaway view of an antenna array according to the embodiments.

Referring to FIG. 2, antenna 12 illustratively comprises twenty-four panel columns 22 that are attached to a central cylinder 26, although the embodiments are not necessarily limited to panel columns (i.e., other types and geometries of antenna columns are contemplated). Antenna 12 scans electronically in azimuth using an electronic matrix switch and has a pair of fixed elevation beams. Both azimuth and elevation monopulse angle measurement are used to provide accurate three-dimensional target coordinates (range, azimuth, and elevation).

Figure 3:
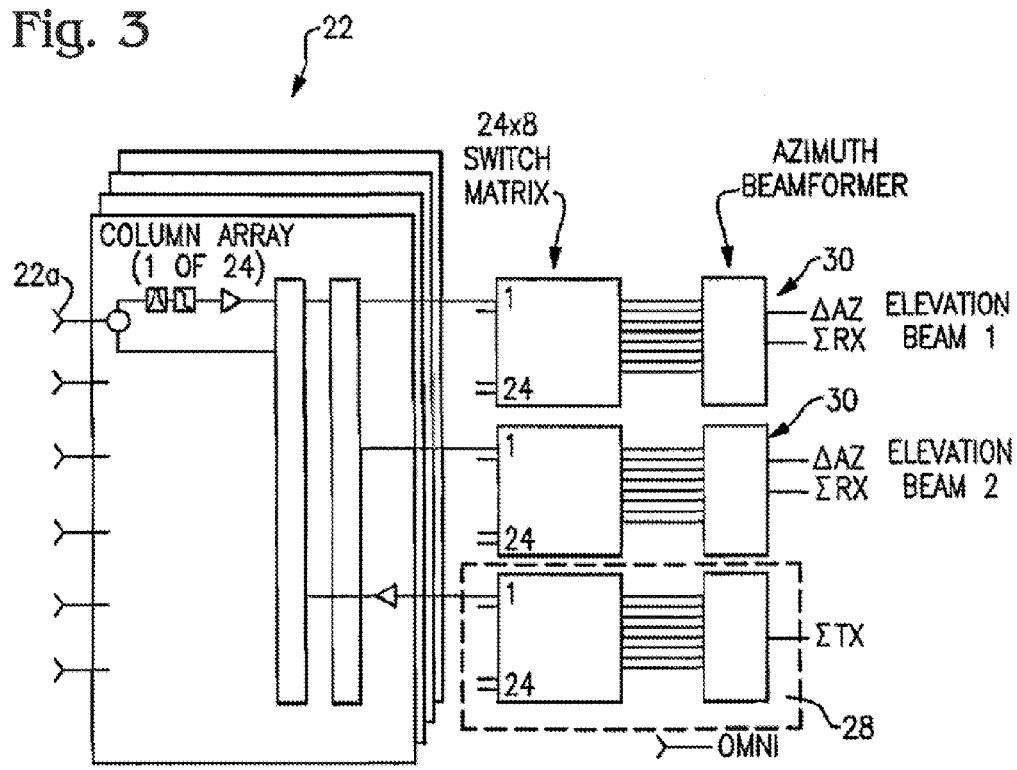
FIG. 3 is a schematic of the circuitry for the electronically steered antenna array according to the embodiments.
Figure 16:
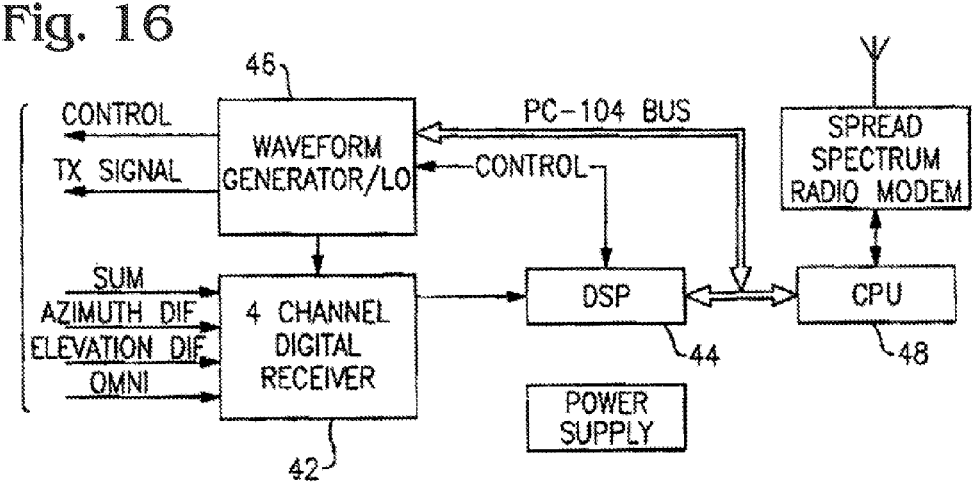
FIG. 16 is a block diagram of the radar electronics that are housed in the antenna cylinder according to the embodiments.

Antenna 12 is constructed of twenty-four radially extending antenna panel columns 22, spaced at fifteen degrees and mounted by support rings 24 to central antenna cylinder 26 that houses a transmit matrix switch assembly 28 and receive matrix switch assembly 30 of which there are two as illustrated in FIG. 3, as well as receiver 42, digital signal processor 44, waveform generator 46, and CPU 48, as illustrated in FIG. 16. Antenna panel columns 22 can be removed and stacked for transport, and can be quickly reassembled when the radar apparatus 10 is deployed.

Figure 4A:
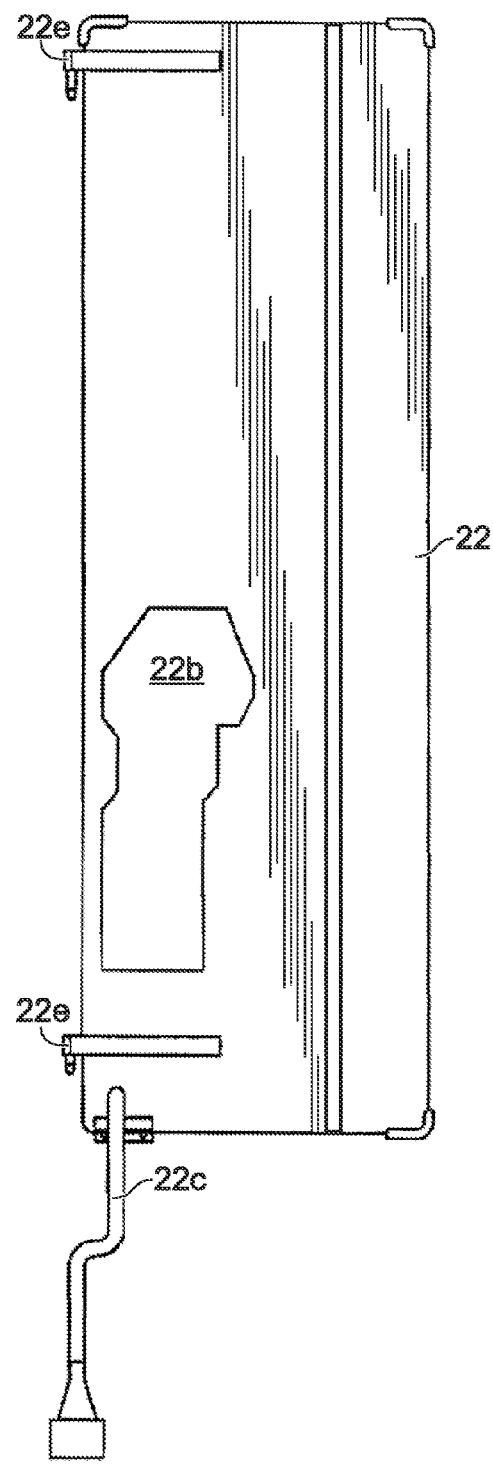
FIGS. 4a and 4b are opposing side elevation views of an antenna column panel according to the embodiments.
Figure 4B:
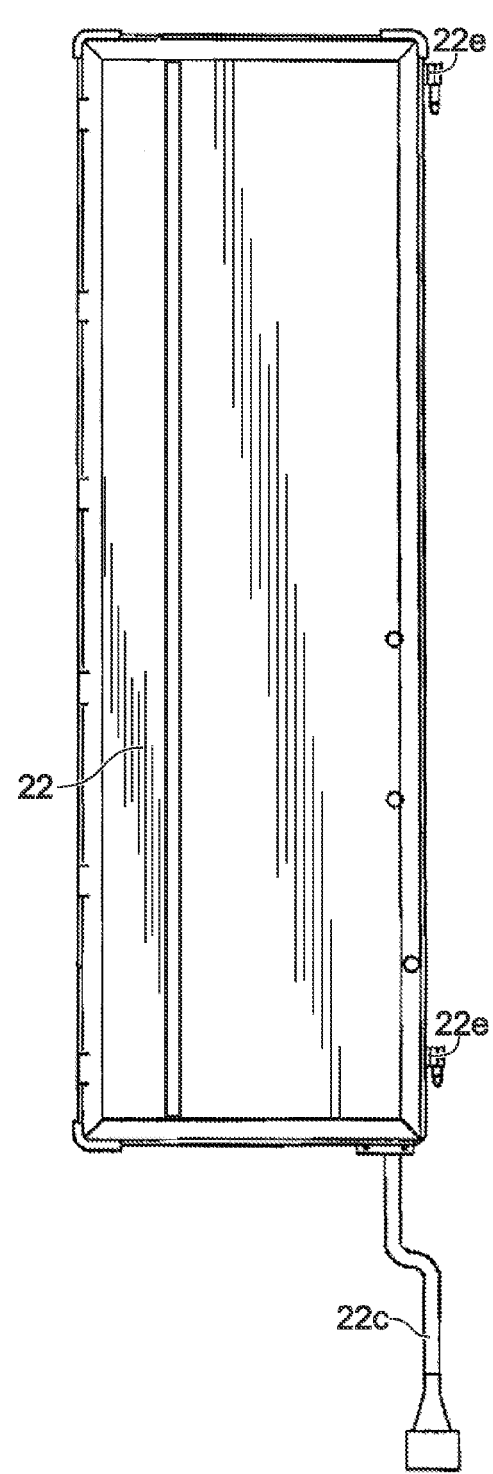

Referring to FIGS. 3, 4a and 4b, each panel column 22 is an etched substrate containing six vertically polarized dipole elements 22a, each with a pre-selector filter, limiter, and low noise amplifier. The six elements are combined on panel column 22 to form two stacked elevation beams that are offset in elevation angle by 17 degrees. A single elevation beam is generated on transmit, centered on the lower receive elevation beam. The elevation beams are independently tapered in amplitude and phase at each frequency to reduce the below the horizon elevation angle sidelobes to suppress the effects of ground-bounce multipath. Each panel column 22 also contains a pair of solid-state power amplifiers 22b that generate RF power pulses for transmission. Each power amplifier drives three elements through an unequal split, three-way power divider. Panel column 22 further comprises cable connectors 22c for electrical interconnection to radar electronics housed in central antenna cylinder 26 and longitudinal slots 22*d* (i.e., shown in FIG. 11) formed parallel and adjacent to their respective inner edges. In addition, each panel column 22 includes a plurality of placement pins 22*e* (as illustrated in FIG. 4*a* and FIG. 4*b*) that engages an opening 23 (i.e., shown in FIG. 2) formed through support rings 24 in axial alignment with the slots 24*a* to further ensure accurate alignment of the panel columns 22 relative to cylinder 26.

Each of the elevation receive beam RF signals and the transmitter RF signal from each panel column 22 are fed into a 24 to 8 electronic matrix that instantaneously selects an 8 column sector and reorders the columns appropriately for the azimuth beamformers. For each azimuth dwell period only 8 of the 24 columns are active. On reception, the azimuth beamformers form an azimuth sum beam and an azimuth difference beam with independent amplitude tapering for optimal sidelobe suppression. The transmit beam is untapered in azimuth.

Figure 5:
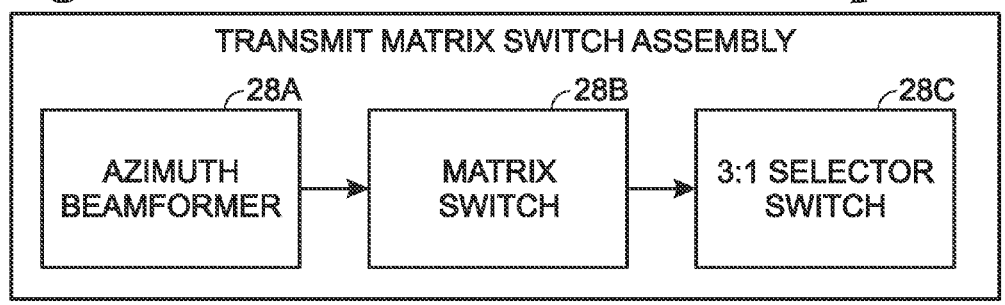
FIG. 5 is a diagram of a transmit matrix switch assembly according to the embodiments.

Referring to FIG. 5, transmit matrix switch assembly 28 includes an azimuth beamformer 28*a* that creates the eight equally weighted transmit signals that form the transmit beam. A matrix switch 28*b* provides beam steering by routing the eight transmit signals to the appropriate eight antenna columns 22 through a 3:1 selector switch 28*c*.

Figure 6:
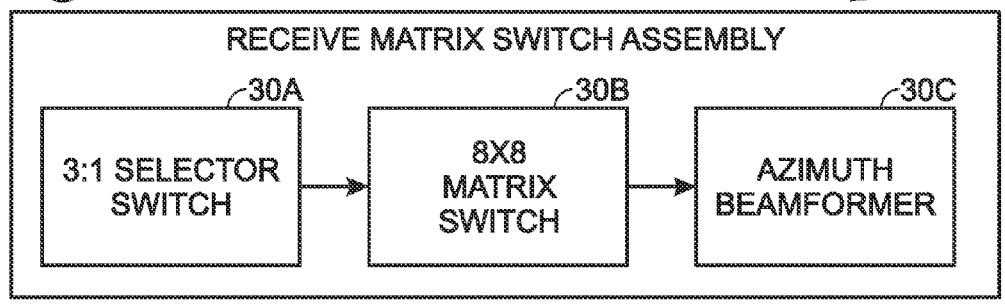
FIG. 6 is a diagram of a receive matrix switch assembly according to the embodiments.

Referring to FIG. 6, receive matrix switch assembly 30 works in reverse of transmit matrix 28 and routs received signals from each of the eight active antenna columns 22 through 3:1 selector switch 30*a* and an 8 by 8 matrix switch 30*b* to an azimuth beamformer 30*c*. Azimuth beamformer 30*c* forms sum and difference beams on receipt of signals.

Figure 7:
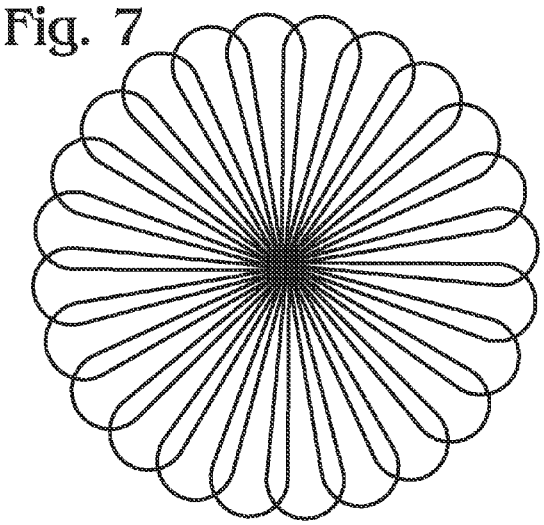
FIG. 7 is a schematic of antenna beam positions according to the embodiments.
Figure 8:
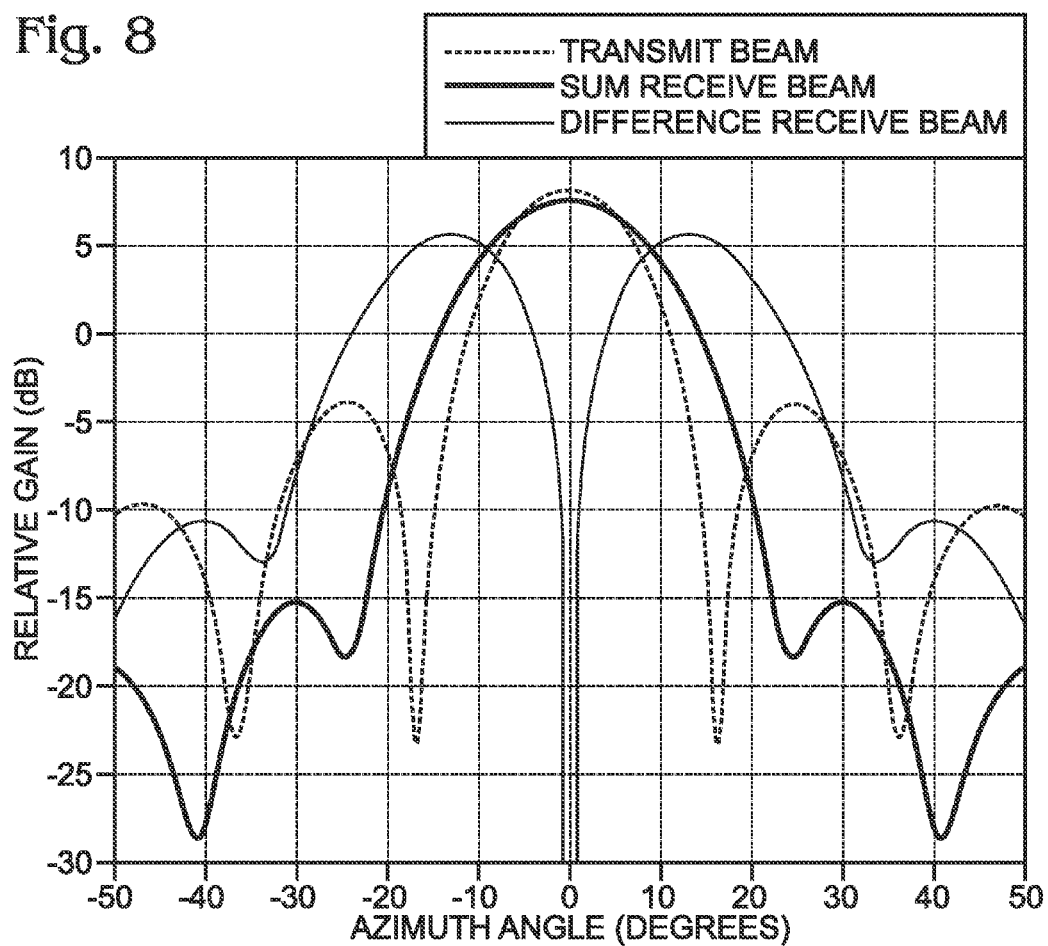
FIG. 8 is a graph of azimuth beam patterns according to the embodiments.
Figure 9:
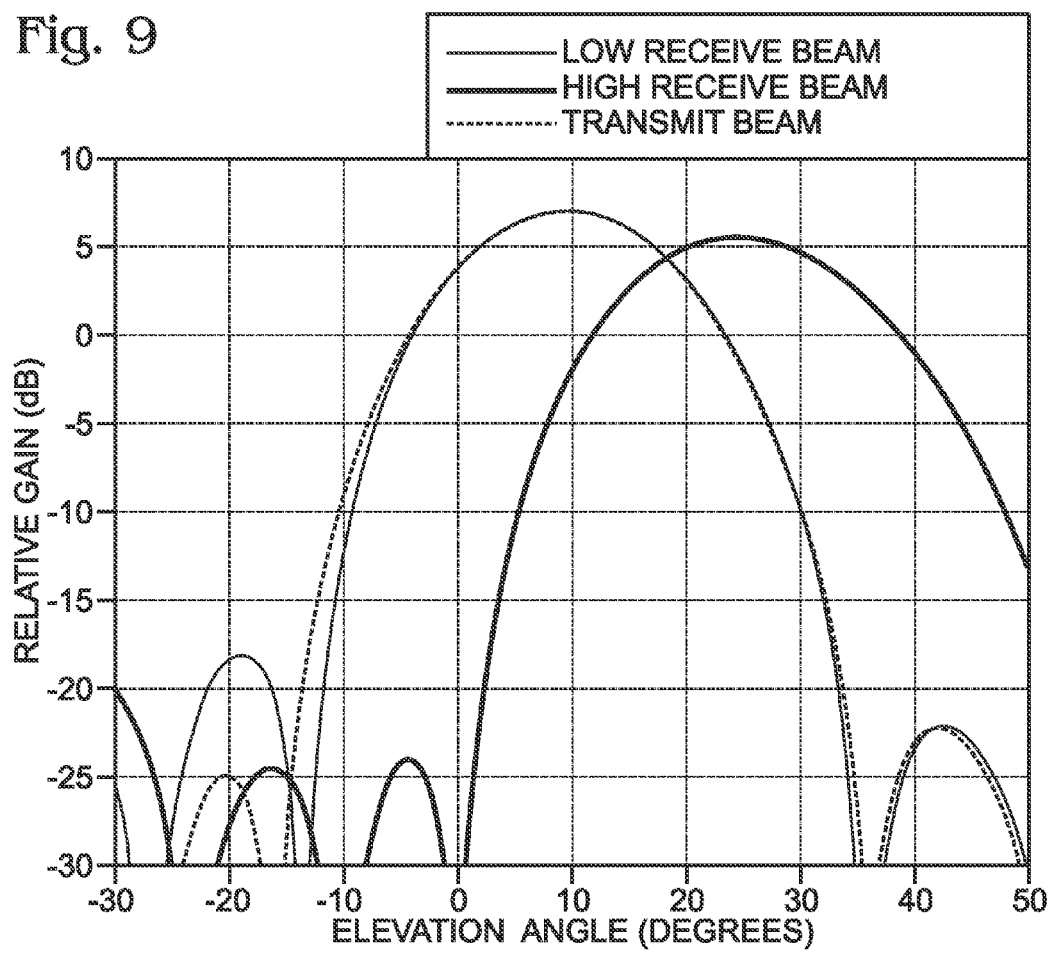
FIG. 9 is a graph of elevation beam patterns according to the embodiments.

Radar apparatus 10 has twenty-four azimuth beam positions 15 degrees apart. The azimuth 3-db beamwidth is slightly wider at 18.7 degrees. A diagram of the twenty-four azimuth beams is seen in FIG. 7 and FIG. 8 depicts the transmit, receive sum, and difference beam patterns in azimuth. FIG. 9 illustrates the three elevation beam patterns of antenna 12, i.e., the transmit beam, lower receive beam, and upper receive beam.

Referring to FIGS. 10-16, antenna 12 is constructed on top of tripod 20. Tripod 20 includes a tri-bracketed connector 36 having thumbwheels for leveling antenna 12 and a boresight scope 38 for aligning antenna 12 in azimuth.

Figure 11:
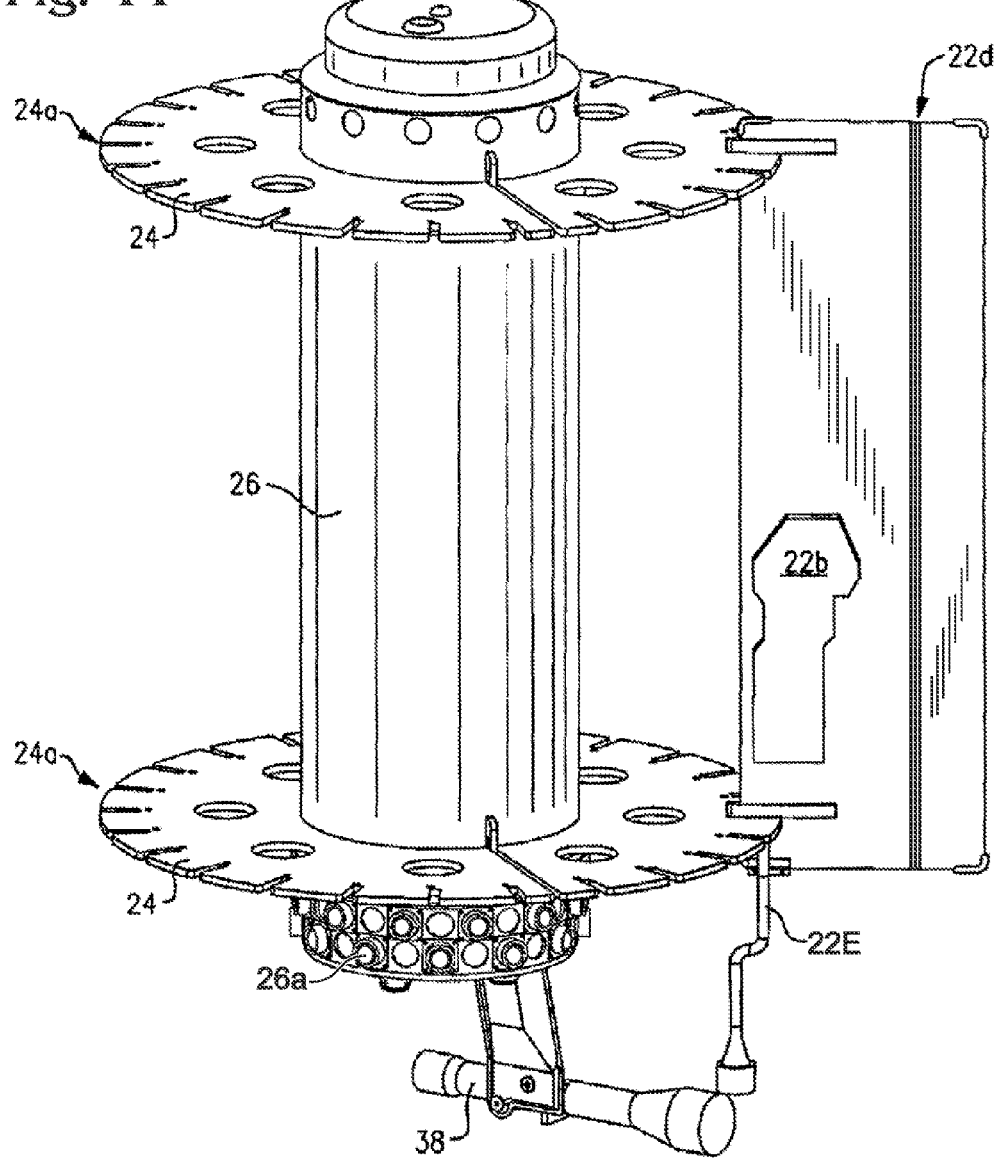
Figure 12:
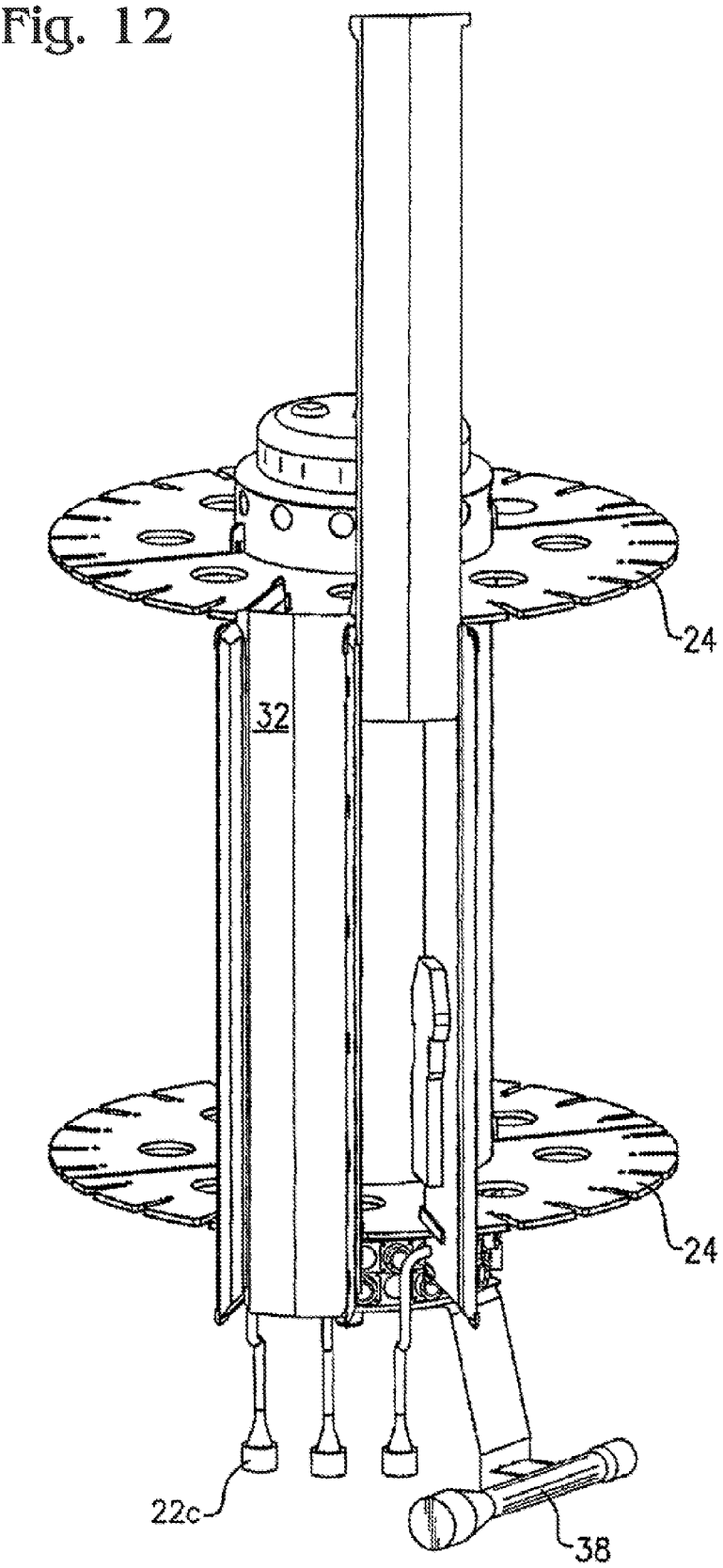
Figure 13:
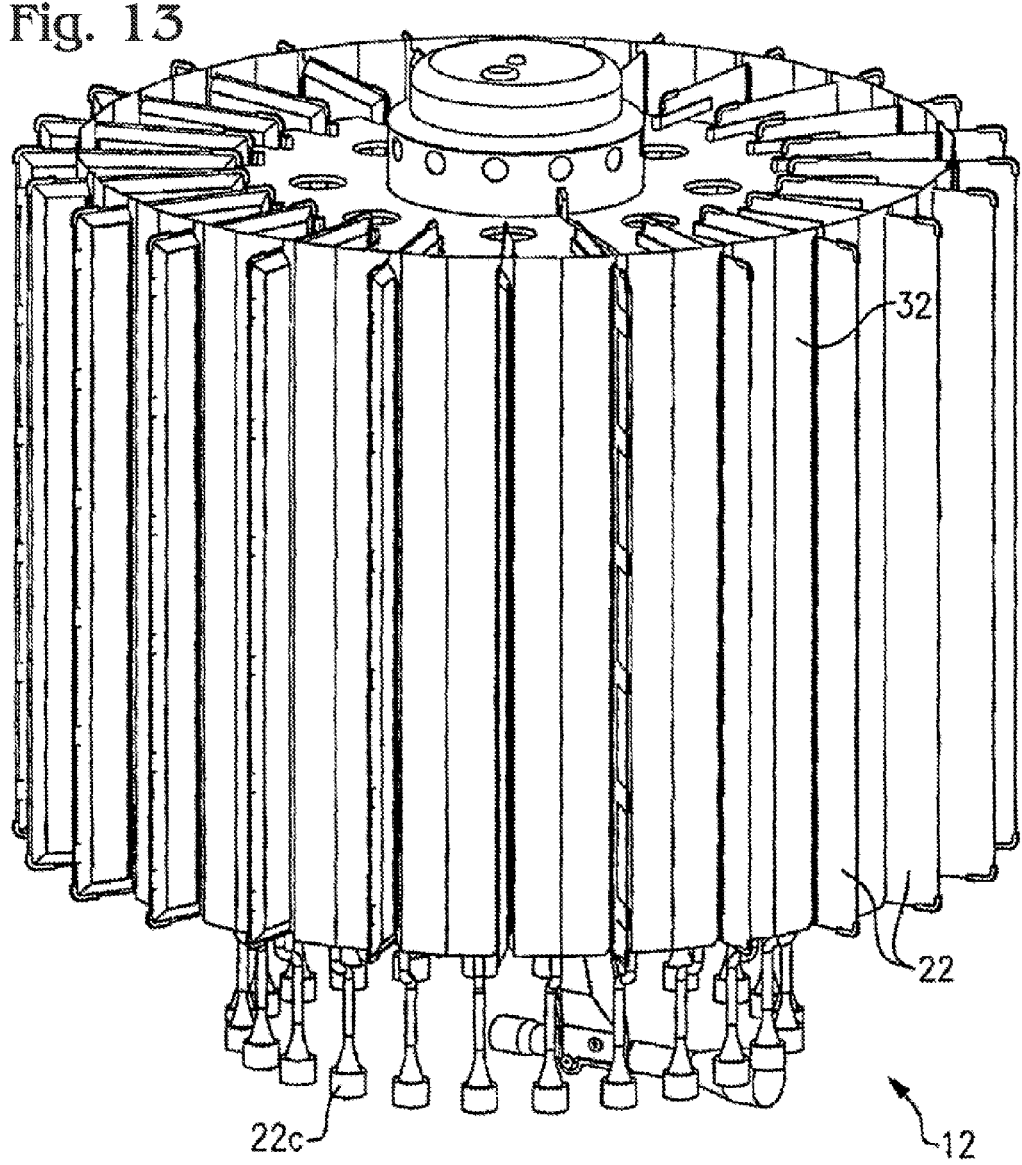
Figure 14:
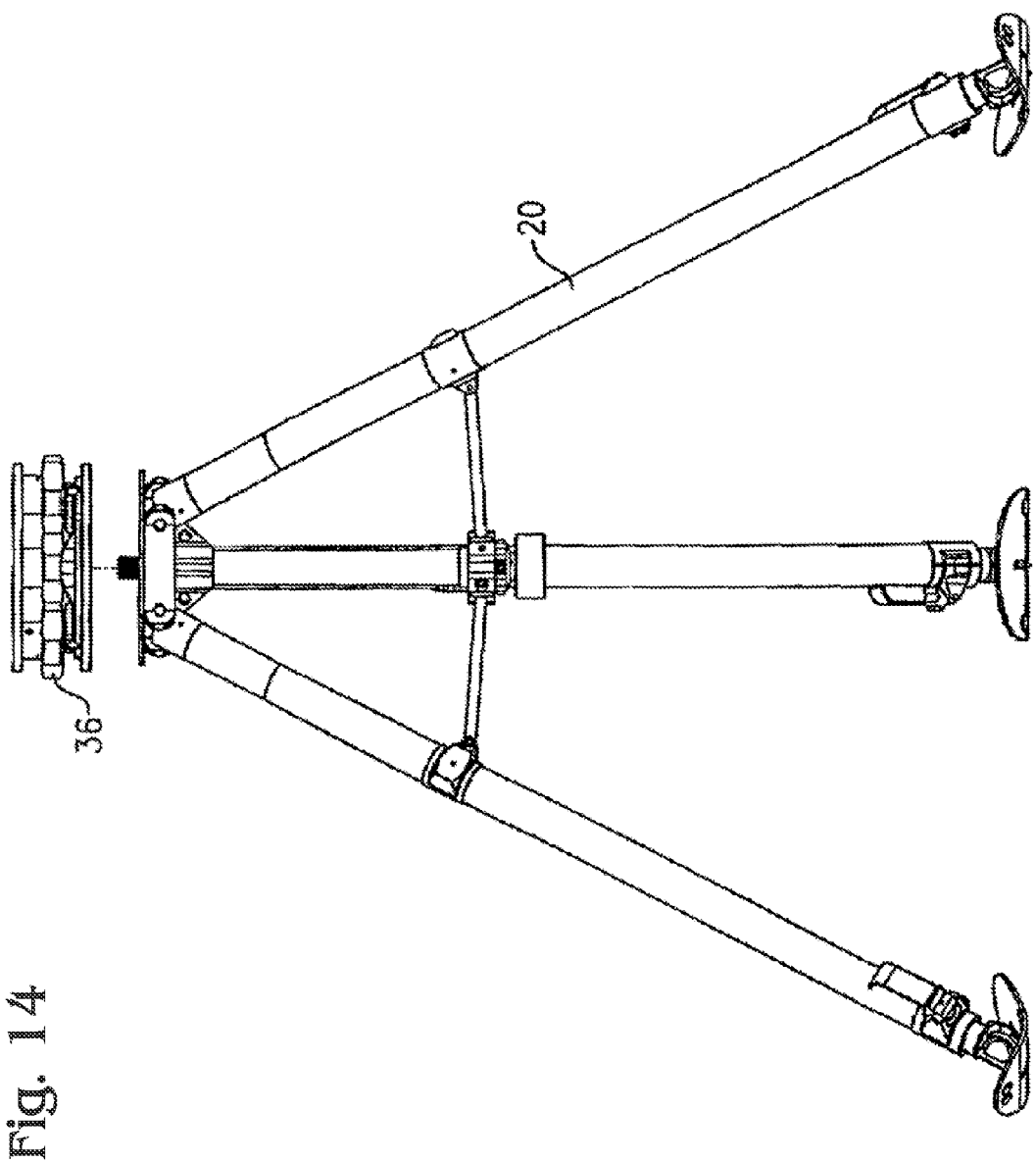
FIG. 14 is an elevation view of a tripod according to the embodiments.

Antenna cylinder 26 is positioned on tripod 20. Two (top and bottom, as illustrated in FIG. 11) or three (top and bottom (as illustrated in FIG. 11), and intermediate (as not illustrated in FIG. 11)) levels of support rings 24 consisting of multiple interlocking panels are mounted around the base, middle, and for added stability if needed, top of antenna cylinder 26. As seen in FIG. 11, support rings 24 have a series of twenty-four circumferentially spaced slots 24*a* for accepting a longitudinal peripheral edge of panel columns 22. Panel columns 22 are then mounted to support rings 24 using slots 24*a*. Once panel columns are in position, a series of ground planes 32 is positioned between adjacent columns 22 by slidingly engaging the peripheral edges into longitudinal slots 22*d*. Cable connectors 22*c* of panel columns 22 are then engaged with corresponding connectors 26*a* on antenna cylinder 26 to electrically interconnect antenna electronics of panel columns 22 with transmit matrix switch assembly 28 and receive matrix switch assembly 30 housed within antenna cylinder 26.

Figure 10:
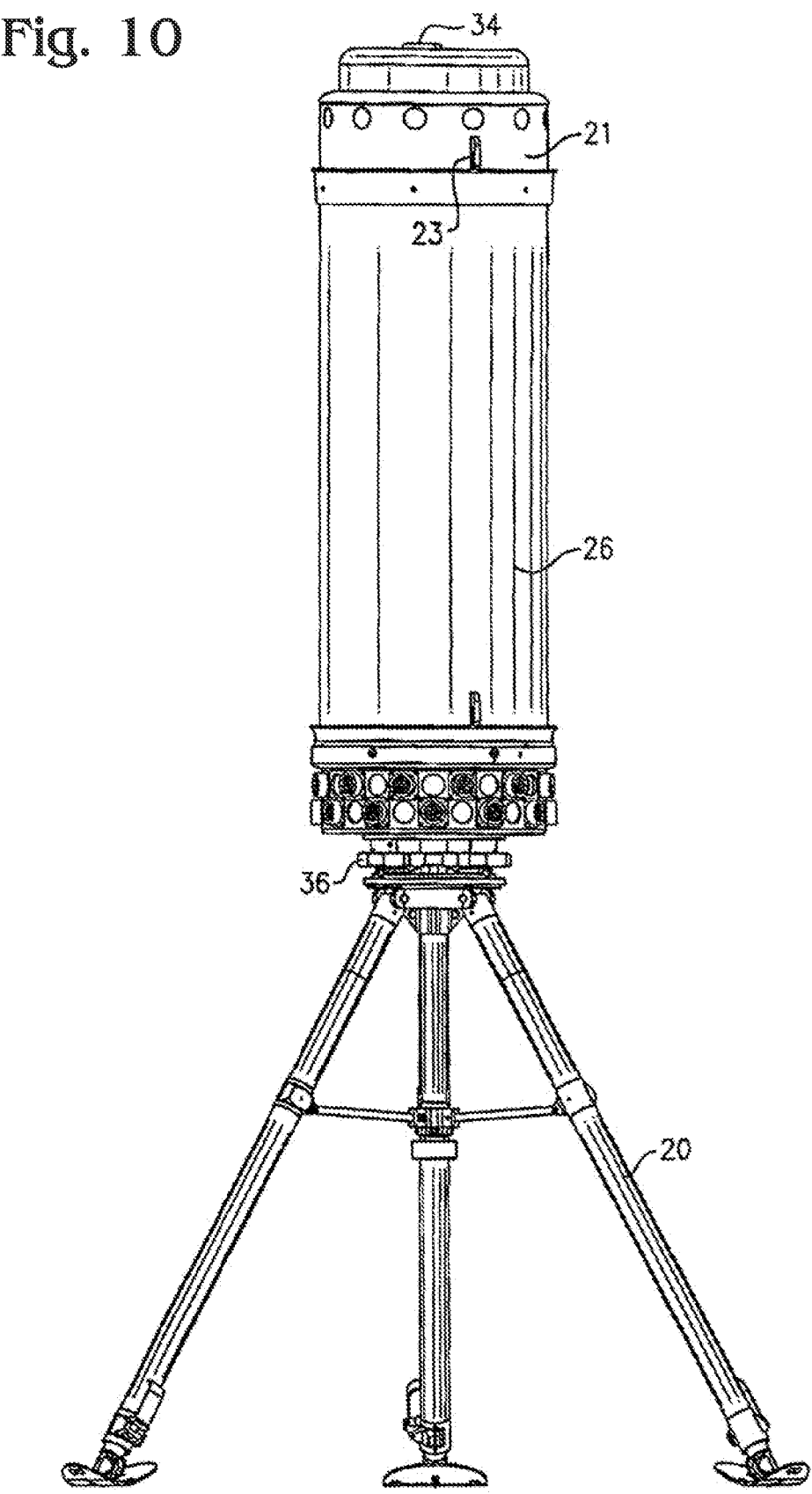
FIGS. 10-13 are elevation views of a radar apparatus at various stages of assembly according to the embodiments.

A small monopole 34 may be placed over antenna 12 (on top of cylinder 26) as illustrated in FIG. 10 to provide an omnidirectional beam used for sidelobe blanking. Monopole 34 generates a hemispherical pattern with a null at zenith.

Figure 15:
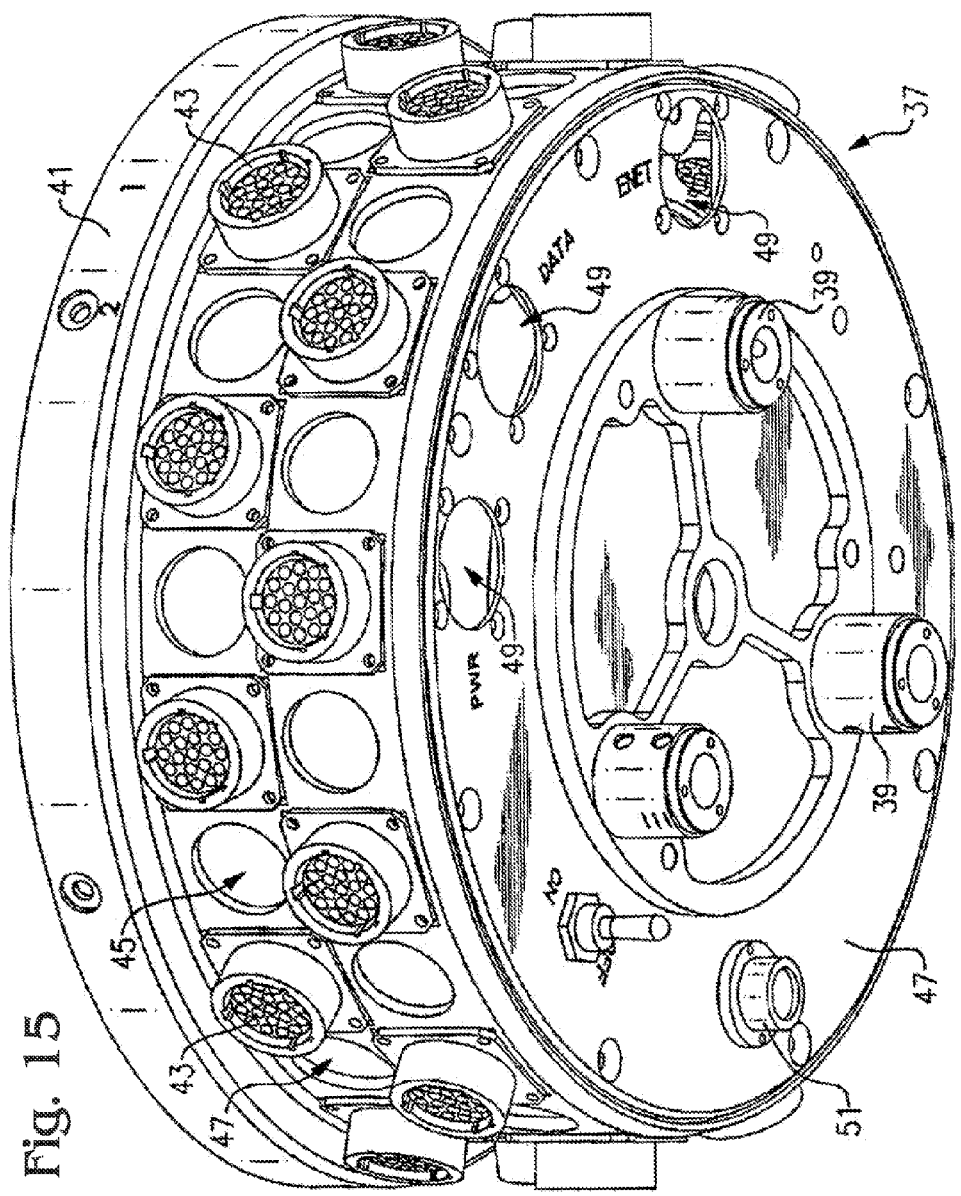
FIG. 15 is a perspective view of an antenna connector ring for interconnecting the antenna cylinder to the tripod.

With reference to FIG. 15, an antenna connector ring 37 may be used to interconnect antenna cylinder 26 to tri-bracket connector 36. Connector ring 37 includes brackets 39 that securely receive the thumbwheels of connector 36, and further includes a circumferential sidewall 41 that envelops the lower portion of cylinder 26, and a plurality of electrical interconnects 43 and vent openings 45 for connecting cylinder 26 to interface with antenna panels 22. A base plate includes openings 49 for power cables, data cables, ethernet cables, and the like. A bubble level 51 provides visual indication of the level of radar system 10 relative to the ground.

Figure 17:
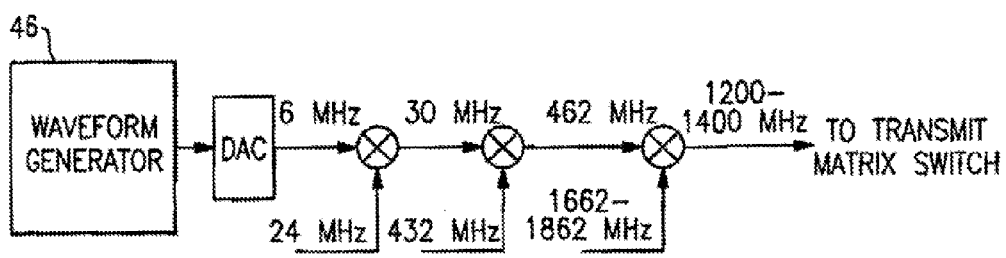
FIG. 17 is a block diagram of a waveform generator according to the embodiments.

As shown in FIG. 16, radar electronics comprise a four channel digital receiver 42, a digital signal processor (DSP) 44, a coherent waveform generator 46 including local oscillators, and a data processor or CPU 48. Waveform generator 46 digitally generates a coherent linear FM pulse at 6 MHz IF. The IF waveform is up-converted to L-band using a three-stage up-converter. The output of waveform generator 46 is sent to a transmit matrix module for distribution to appropriate antenna columns 22. A block diagram for waveform generator 46 is seen in FIG. 17.

Figure 18:
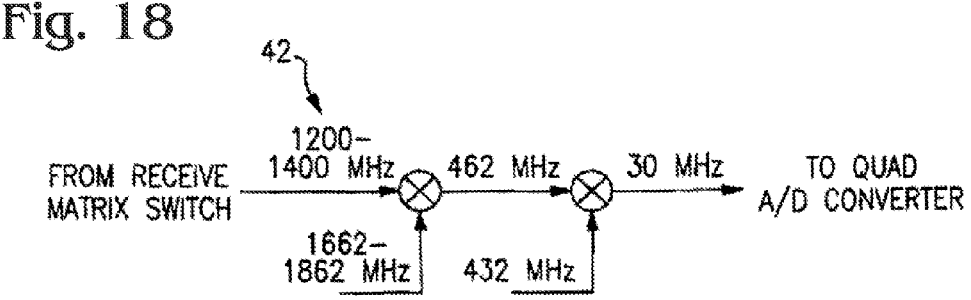
FIG. 18 is a block diagram of a receiver downconvertor according to the embodiments.

Digital receiver 42 uses a double-conversion superheterodyne design with an output IF of 30 MHz. Receiver 42 has four channels: low beam sum, low beam azimuth difference, upper beam sum, and upper beam azimuth difference. Receiver 42 outputs are fed into a four channel A/D converter card that directly samples the four 30 MHz IF signals with an A/D converter as a sample rate of 24 MHz. The four channels are then converted into a baseband complex signal using a digital downconverter, implemented in a field programmable gate array with an internal clock rate of 144 MHz. The complex data is sent to DSP 44 using high-speed data links. A block diagram for receiver 42 is seen in FIG. 18.

Figure 19:
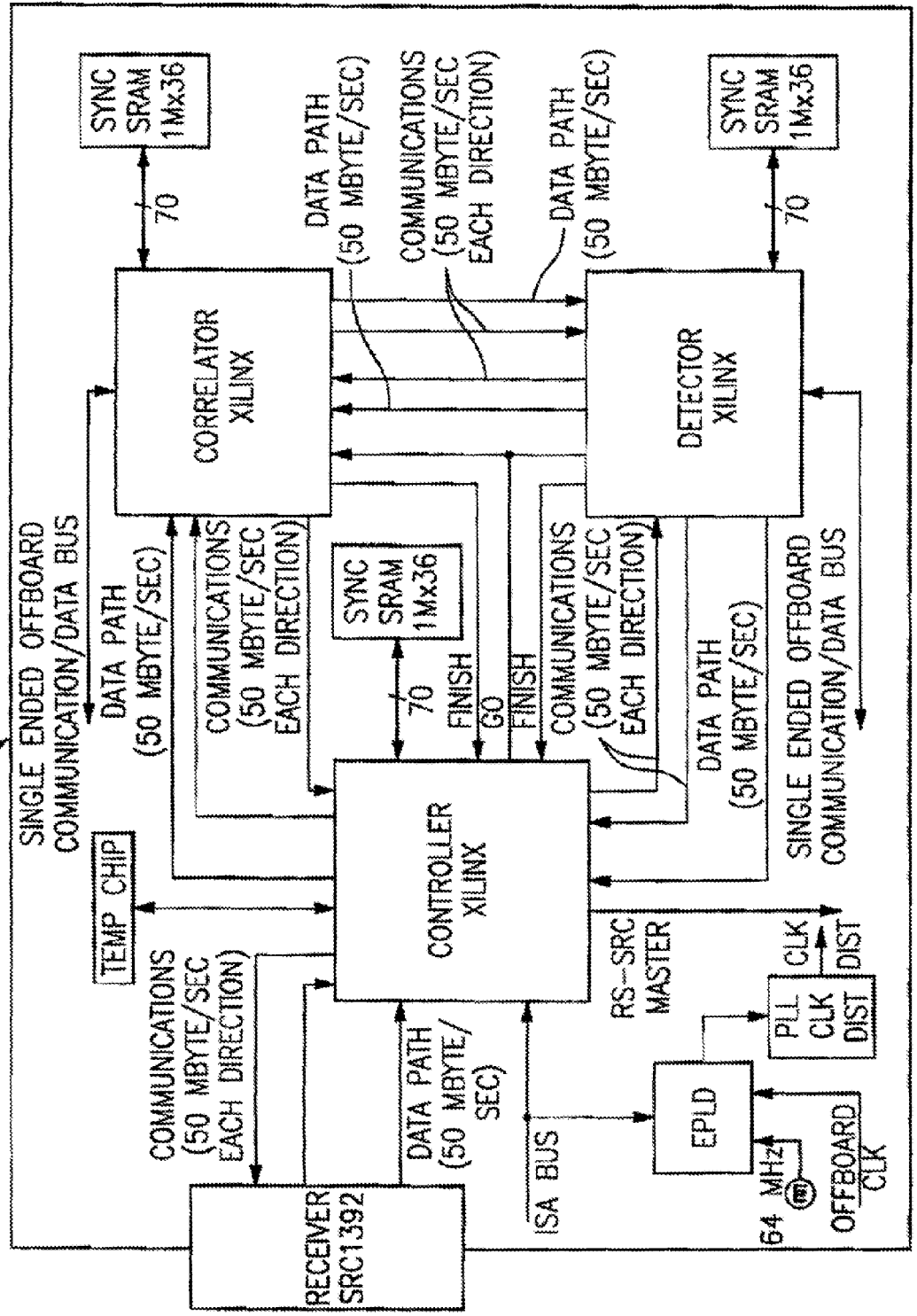
FIG. 19 is a block diagram of a digital signal processor according to the embodiments.

Referring to FIG. 19, DSP 44 comprises three high-speed field programmable gate arrays (FPGAs), such as a Xilink Virtex-EM having more than 9 billion usable operations per second. Each FPGA node has 4 Mbytes of 100 MHz static RAM. There are 50 MBPS bi-directional communication links and 50 MBPS data channel loops between each node. A constant false alarm rate (CFAR) detector extracts target detections from the upper or lower sum beam while rejecting clutter and other extraneous returns. Once a detection is declared in either the upper or lower sum beam, the data in the opposite sum beam and the corresponding azimuth difference beam is used for elevation and azimuth monopulse processing and for the rejection of side-lobe targets. All detection data are sent to the embedded CPU 48 for further processing.

Embedded CPU 48 is a single board computer that is PC/104 compatible and has four serial channels, 48 digital I/O lines and 10/100 Ethernet networking capability. For example, a WinSystems EBC-TXPLUS configured with an Intel Pentium 166 MHz processor is acceptable. CPU 48 operates the radar. For each multiple-pulse radar dwell, CPU 48 selects that azimuth beam position, chooses the waveform to be transmitted, and receives resulting detections. CPU 48 also processes detection data to provide range and angle sidelobe blanking, monopulse angle measurement, fine range measurement, and single scan correlation. The processed detection data is then sent to laptop computer 16 for additional processing and display.

Laptop computer 16 is used for radar control and display, as well as data processing, calibration and operation in accordance with the embodiments and the invention as described in greater detail below. Embedded CPU 48 sends processed detections to laptop 16 for processing by target tracking software. Target track files are maintained on all detected targets. Once sufficient track points are collected on a target, the data is processed by a discriminator that makes an initial determination as to whether the target is a projectile. All targets that discriminate as projectiles are then processed by a trajectory estimator that performs a more detailed target discrimination function to help eliminate false launch point locations from being generated. The trajectory estimator uses a Kalman filter technique to estimate the launch and impact points from the target track data. The target detections, track, launch points, and impact points are all displayed on a PPI display on laptop 16.

Power for radar system 10 may be provided by a conventional AC-DC power supply 18*a* singularly or in conjunction with portable generator 18.

Figure 20:
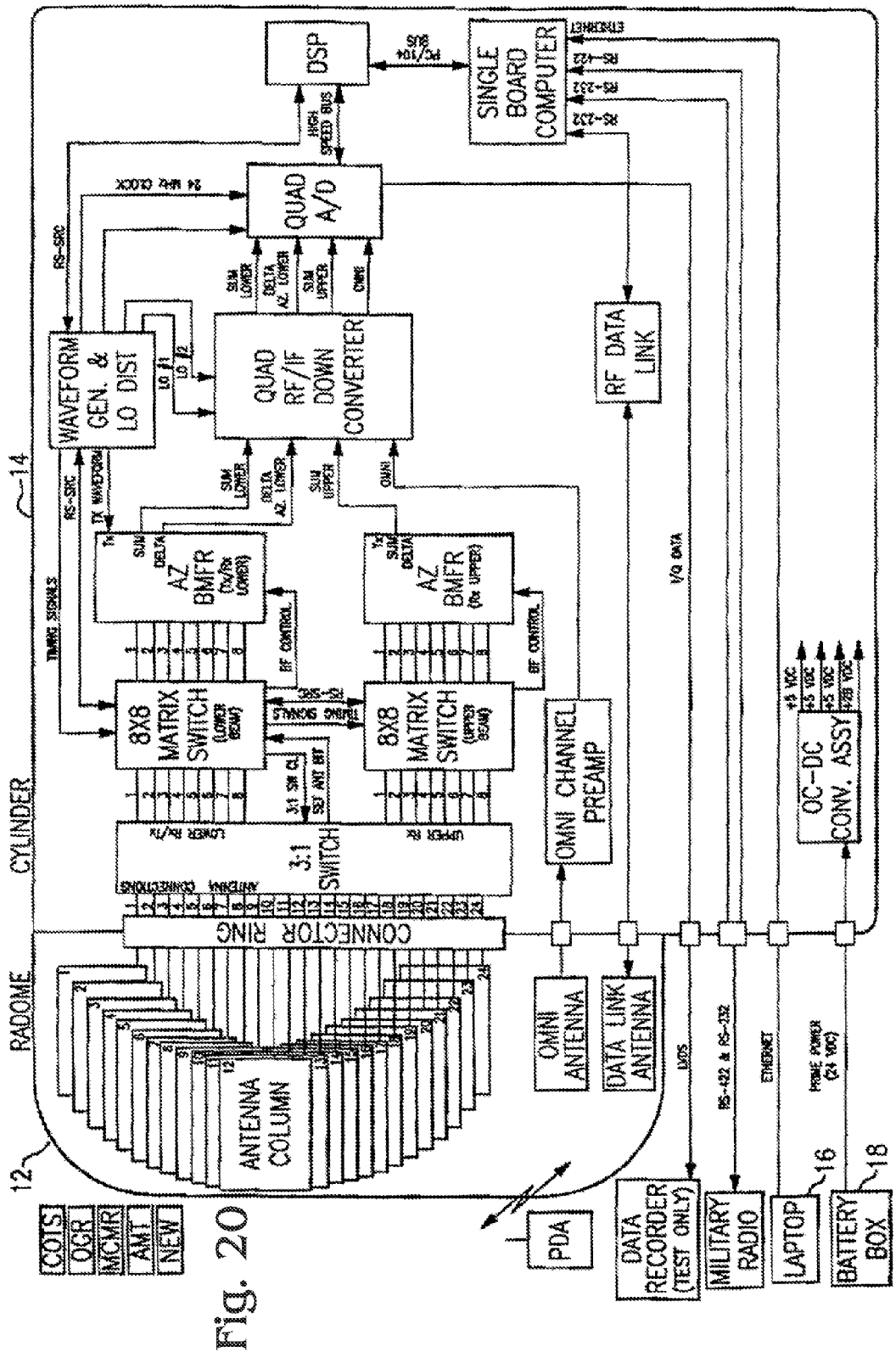
FIG. 20 is a block diagram of the hardware of a radar apparatus according the embodiments.

FIG. 20 illustrates the interconnection of the various hardware comprising radar apparatus 10, such as antenna panel columns 22, laptop 16, power source 18, and receiver-signal processor 14 housed in antenna cylinder 26. Programmable firmware and software operations occur largely in digital signal processor 44 and laptop 16, and are discussed in greater detail hereafter.

Referring to FIG. 21, digital signal processor 44 comprises a series of firmware operations including a discrete Hilbert transform (DHT) 50, a time domain correlator (TDC) 52, a Doppler filter (DOP) 54, and target detection (DET) 56.

Discrete Hilbert transform performs digital down conversion and filtering. An integrated FPGA converts the digital IF data to complex in-phase and quadrature data using a digital complex demodulator and pass band filter. The filter may be changed by loading a different set of filter coefficients in a configuration file.

Time domain correlator 52 takes the received data and correlates it against a stored replica or the transmitted pulse, the equivalent of using a matched filter. Because all radar apparatus 10 waveforms use linear FM coding with a 1 MHz excursion, this operation results in a compressed pulse width of approximately 1 microsecond.

Doppler filter (DOP) 54 is carried out using a 128 or 256 point FFT operation. The number of points in the FFT is equal to the number of pulses in a radar dwell. In normal operation, radar apparatus 10 uses 128 or 256 pulses per dwell. However, other dwell modes, such as 512 or 1024 pulses, are available for use. The two-dimensional array of range-Doppler cell data generated by Doppler filter 54 is stored in memory and accessed by target detection module 56.

Target detector 56 is accomplished by using a sliding window constant false alarm (CFAR) detector. Target detector 56 also carries out bump detection in both range and Doppler to reduce the number of detections caused by large targets.

Figure 22:
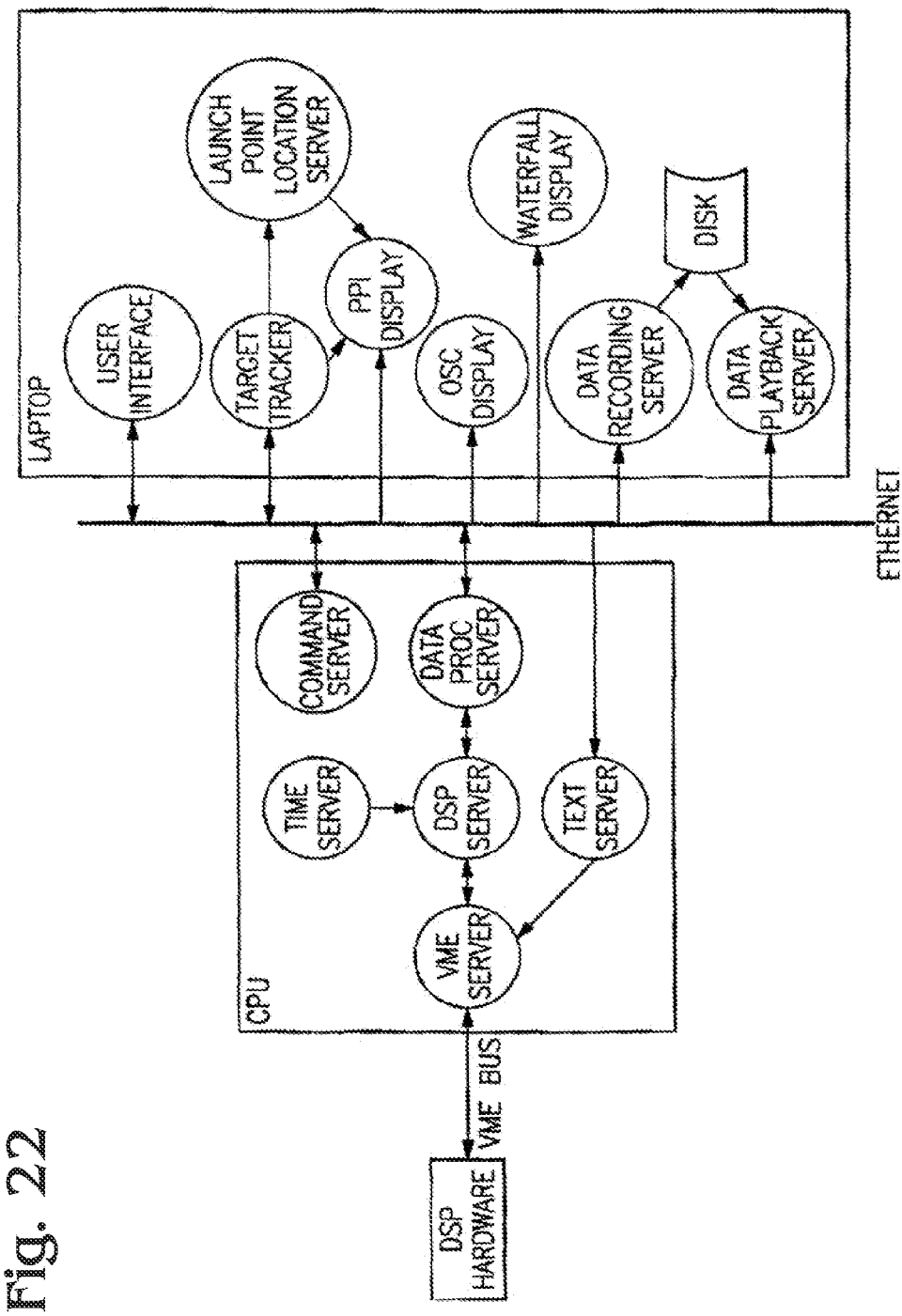
FIG. 22 is a block diagram of software for operating a radar apparatus according to the embodiments.

Referring to FIG. 22, software installed on laptop 16 provides radar control, data processing, information display, data recording, and playback capabilities. It should be understood that a variety of software implementations are possible for managing and displaying the reading obtained by radar apparatus 10. Similarly, a variety of graphical user interfaces is possible for enhancing user operation of radar apparatus 10. For example, custom windows may be designed for the entry of radar parameters and controls as well as turning the radar on and off. Similarly, software may provide a plan position indicator (PPI) display for tracking relative motion of targets, an oscilloscope display for visualizing the contents of DSP 44 memory, or a waterfall display of historical parameters and targets detected by radar apparatus 10.

The Calibration and Operation Method, System and Computer Program Product The method of the inventive monopulse calibration utility for radar apparatus, such as but not limited to the foregoing radar apparatus 10, is a novel radar calibration method that uses a piecewise calibration of several key components to effect radar apparatus 10 operation. This particular calibration method is generally executed by custom engineering software that generates monopulse calibration lookup tables based on predicted receive beam patterns.

As is noted above, within the context of the embodiments, a particular non-limiting radar apparatus 10 includes two major subsystems: (1) an electronics cylinder 26 that includes the waveform generator, radar receiver, and the analog and digital signal processor; and (2) twenty-four antenna panel columns 22 that each contain six vertically polarized dipoles mounted on a composite substrate. Each antenna panel column 22 contains an elevation beamformer which forms two simultaneous stacked elevation beams. Each antenna panel column also contains an RF power amplifier, LNAs (i.e., low noise amplifiers) and filters for the receive signal.

During operation, the radar apparatus 10 will use the electronics in the cylinder 26 and a group of eight contiguous antenna panel columns 22 to form four receive beams (upper sum, lower sum, upper delta (i.e., azimuth difference), lower delta (i.e., azimuth difference). When a target is detected, the signal received through each of these four beams is used in a calculation to determine the precise azimuth and elevation angles between the radar apparatus 10 and the target. The accuracy of radar apparatus 10 calibration will ultimately determine the accuracy of the angular measurements of a target position.

The foregoing radar apparatus 10 was designed to be lightweight, set up quickly without tools, and operated in a hostile environment. Radar apparatus 10 antenna panel columns 22 must also be able to be replaced in the field in the event of a panel column 22 failure. As a result of these requirements, commonly used calibration methods for radar apparatus 10 are generally not feasible. In more typical and conventional radar apparatus and radar systems, monitor feeds may be used to measure and automatically adjust radar beams during operation. These monitor feeds would not be feasible in a radar apparatus that is assembled on site. Rapid deployment, setup in a hostile environment, and the requirement for assembly without tools, eliminate the possibility of a radar apparatus 10 calibration that relies on beam measurement before startup. Replacing a failed antenna panel column 22 will introduce a new set of radiating elements, power amplifiers, receive circuitry, and elevation beamformer. This will cause the receive beams to be slightly different and would require a system-wide calibration (which is common with other radars) to be repeated each time a radar apparatus 10 panel column 22 is replaced. For each of these reasons, a mathematical approach to synthesize and simulate radar apparatus 10 patterns based on a priori (i.e., laboratory or manufacturing) measurement of the panel columns 22 and electronics cylinder 26 would be at least desirable, if not necessary. This approach is in accordance with the embodiments described herein.

The radar apparatus 10 uses a standard monopulse processing technique in azimuth and elevation to determine the angular location of a target. Monopulse processing calculates the beam ratio of two different antenna beams and determines precise angle to a detected target. With this technique, each beam ratio corresponds to a unique target angle. The more accurately these beam ratios are known, the more accurately the target angle can be determined. A considerable issue with using monopulse processing is determining beam responses as a function of angle. Beam responses will be affected by electronic component behavior, signal losses and mechanical construction, as well as other design considerations, so such beam responses are normally difficult to predict. For that reason, beam responses are usually measured after a radar apparatus is fully constructed and installed. As is noted above, such post construction and installation beam response measurement is generally not practical for radar apparatus 10.

In order to predict the foregoing beam responses (and the related beam response ratios) at all azimuth and elevation angles, the beam responses need to be simulated based on measurements of each individual antenna panel column 22 and electronics cylinder 26. These measurements will determine the electrical behavior of these components across frequency, angle and beam number. These measurements will also predict a response of an assembled radar apparatus 10 according to which order a plurality of antenna panel columns 22 is installed in the radar apparatus 10. The following method that combines these measurements attempts to eliminate calculation errors as much as possible by reducing many of the simplifying assumptions that are common with alternative methodologies.

Although all of the antenna panel columns 22 and the electronic cylinders 26 produced for radar apparatus 10 are designed and built to behave exactly the same, each will be slightly different due to manufacturing tolerances and electrical differences in the internal components. These differences will alter the behavior of the generated beams within an assembled radar apparatus 10. Since each of these components will have a slightly different effect on the radar apparatus 10 beam patterns, it is not possible to predict how these slight variances affect the overall radar apparatus 10 beam response without simulating these radar apparatus 10 beam patterns.

Thus, the embodiments provide a calibration and operation method and system for a radar apparatus, such as but not limited to radar apparatus 10, in accordance with FIG. 23 (which is directed towards determining radar calibration files) and FIG. 24 (which is directed towards manipulation and application of those radar calibration files to provide for determination of location and trajectory of a target).

In accordance with FIG. 23, such a calibration and operation method and system provides that an individual radar antenna cylinder 26 and a plurality of antenna panel columns 22 are subject to laboratory measurements (also intended to include manufacturing measurements or other pre-assembly measurements, such as but not limited to quality assurance measurements) to determine corresponding column data files 60 and cylinder data files 62. Further the column data files 60 and the cylinder data files 62 are inputted into a calibration utility 64 (i.e., including but not limited to a software program that may reside in the laptop computer 16) that in turn determines a series of radar calibration files 66.

With respect to column data files 60, individual antenna panel columns 22 are inserted into a test fixture which measures the electrical behavior of the individual antenna panel columns 22. The electrical behavior measurements that are made are specifically the scattering parameters (more commonly known as "S-Parameters"). The test fixture apparatus used to perform these measurements (which is intended as separate from but related to the instant invention) uses a mathematical algorithm (which is also intended as separate from but related to the instant invention) to convert the S-Parameters into a set of complex (magnitude and phase) far-field azimuth and elevation beam patterns that describe each antenna panel column 22 at each frequency of interest. The complex (magnitude and phase) beam patterns are used as an input to an inventive algorithm in accordance with the embodiments.

The complex (magnitude and phase) beam patterns are determined for each of 24 antenna panel columns 22 at all frequencies of interest. These beam patterns are determined from a single measurement for each of 24 antenna panel columns 22 using the foregoing test fixture apparatus that is specifically designed to measure the antenna beam patterns of the antenna panel columns 22. The single measurement for each of the 24 antenna panel columns 22 is combined with a simulated element pattern for an assembled radar antenna 12 to synthesize the entire complex (magnitude and phase) beam pattern of the assembled radar antenna 12. There are two outputs of the antenna panel columns 22, upper and lower. While the upper and the lower outputs are measured in the same manner, the electronics that are being measured are different, and therefore, the electrical test results are typically different:

The "upper" beams are designed to have a maximum magnitude response at a higher elevation angle than the "lower" beams. Mathematically, these complex beam patterns are referred to as "$BU_{fn}$" (upper) and "$BL_{fn}$" (lower) where "f" is the frequency of interest, and "n" is the serial number of a particular column panel 22. The complex beam patterns are measured at all azimuth angles from −90 degrees to 90 degrees (where zero degrees represents the line radial from the center of the cylinder along each antenna column) and at all elevation angles from −90 degrees to 90 degrees. Since all elevations angles are not processed by this algorithm, elevation angles less than −10 degrees or greater than 40 degrees are excluded. A trivial phase correction is typically performed on each antenna beam pattern to move the far field pattern phase center to a center of an electronics cylinder 26 once the cylinder 26 is assembled into a radar apparatus 10. These phase corrected antenna panel column 22 pattern measurements are stored electronically in a manner that can be accessed easily by a calibration tool (i.e., a software tool). A typical upper antenna panel column pattern is shown in FIG. 25. FIG. 26 shows a beam pattern of an entire antenna array (i.e., whole radar).

In accordance with the foregoing description, each of the twenty-four antenna panel columns 22 will be connected to the radar apparatus central electronics cylinder 26. The signal received by each antenna panel column 22 passes into the electronics cylinder 26 and is combined to form a final receive beam.

Similar to the antenna panel columns 22, each radar apparatus 10 electronics cylinder 26 is designed to be exactly the same for each radar apparatus 10 system, but due to the complexity of the components inside, each electronics cylinder 26 behaves slightly different. To more accurately characterize the received signals in the radar cylinder 26, an additional set of measurements is undertaken. The cylinder data file 62 data measured by this test is also used by the calibration utility 64 along with the column data file 60 data from each of the twenty-four antenna panel columns 22, to generate the final simulated radar beam patterns in accordance with reference numeral 68 of FIG. 24.

To characterize the electrical changes that occur to each signal passing into the central enclosure radar cylinder 26, a measurement routine is also performed on this radar apparatus 10 component. As part of this test, a calibrated test signal is passed into an antenna connector on the outside of the central enclosure radar cylinder 26 (see, e.g. reference numeral 26a at FIG. 11 or reference numeral 43 at FIG. 15) and the change in phase and magnitude is measured at the analog to digital converter (see. e.g., FIG. 20 and FIG. 21). This test is repeated for all frequencies of interest, for each of the 24 antenna connectors as defined above, and for each of the 8 beam positions. This data will be referred to as "$T_{fCB}$" where "f" is the frequency being measured, "C" is the number of the connector (1 through 24), and "B" is the beam number "1 through 8". The data collected during these measurements is stored to a file that corresponds to the serial number of the central enclosure radar cylinder 26.

Before the panel column 22 and central enclosure radar cylinder 26 measurements can be processed, a beam synthesis must first simulate a geometry of a radar apparatus 10 assembled from the panel columns 22 and the radar cylinder 26. The desired result of the geometry simulation is to map the needed azimuth and elevation indexes for each panel column 22 position in a beam to the overall beam azimuth and elevation of a plurality of simulated target locations. FIG. 31 shows a coordinate system used to model the radar apparatus 10 (x,y,z), and a coordinate system used to model the individual panel columns 22 (a,b,c). "Target 1" represents a target at zero degrees elevation relative to the (a,b,c) coordinate system, and "Target 2" is a target at phi deg elevation relative to the same coordinates. To assist in visualization, a rotation matrix is applied to a target azimuth and elevation relative to this panel column 22 centric coordinate system, and the height of the array from the ground is removed later to bring the resulting azimuth and elevation back to a radar apparatus 10 centric (x,y,z) coordinate system.

Figure 32:
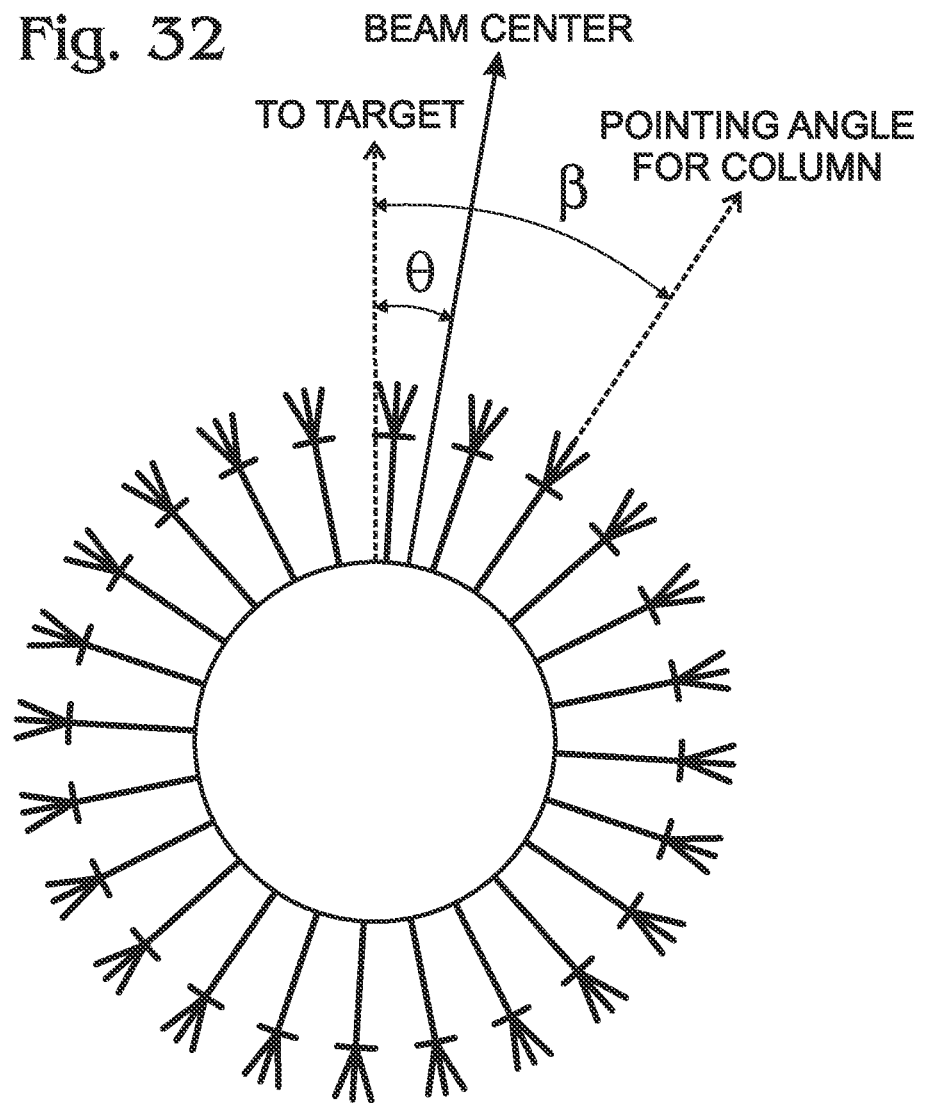
FIG. 32 is a plan-view diagram of an assembled radar apparatus illustrating geometric parameters according to the embodiments.

For an azimuth simulation, the observation that each antenna panel column 22 is offset from an adjacent panel column 22 by fifteen degrees along with the definition of the center of each beam as a mid-point between its fourth and fifth panel column 22, allows for a bulk azimuth offset of 15× (beamposition−4.5). Where beamposition is 1-8, clockwise as viewed from the top of a radar apparatus 10. FIG. 32 shows an example of an azimuth pointing angle for a panel column 22 position 6 in a beam. A target is located at an angle theta with respect to the beam center, and with an angle beta with respect to the panel column 22.

To simulate the radar apparatus beams, the measured beam pattern of each antenna panel column 22 is weighted by the measurements made from the central enclosure radar cylinder 26 for each of the 8 possible beam positions at each frequency of interest. To determine the azimuth and elevation needed for a particular panel column 22 contribution, the following rotation matrix and translation are used:

$$[x \ y \ z] = [Tx \ Ty \ Tz] \begin{bmatrix} \cos(\phi)\cos(\theta) & -\cos(\phi)\sin(\theta) & \sin(\phi) \\ \sin(\theta) & \cos(\theta) & 0 \\ -\sin(\phi)\cos(\theta) & \sin(\phi)\sin(\theta) & \cos(\phi) \end{bmatrix} - [Rx \ Ry \ Rz]$$

where T is a location of a simulated target (in x,y,z coordinates), R is a location of a simulated antenna panel column 22 (in x,y,z coordinates), φ is a simulated elevation of the target within a simulated assembled radar apparatus 10 (i.e., illustratively, but not limited to 24 panel columns 22 and one cylinder 26) beamspace and θ is a simulated azimuth of the target within the simulated assembled radar apparatus 10 (i.e., illustratively, but not limited to 24 panel columns 22 and one cylinder 26) beamspace, each offset by the column position effect (i.e., relative to a center of a radar cylinder 26 and an elevation of the radar panel 22 above a terrestrial ground plane) as described above. For the purpose of a far-field calibration, the x-dimension of T is assumed to be arbitrarily large, and the z-dimension of the antenna panel column 22 and the target are set equal to each other. The y-dimensions of both are zero under circumstances of a target at boresight. Thus, the foregoing matrix and translation maps a simulated target in an overall assembled radar apparatus beamspace back to a beamspace of each individual radar panel column within the assembled radar apparatus (i.e., a column-centric beamspace) so that the individual radar panel column contribution to the overall assembled radar apparatus beamspace can be simulated. The resultant vector can then be used to resolve an actual azimuth az and an actual elevation el of the simulated target (which is positioned relative to the center of the assembled radar apparatus 10) further relative to a center of an individual panel column 22 via:

$$az = \tan^{-1}\left(\frac{y}{x}\right)$$

$$el = \tan^{-1}\left(\frac{z}{\sqrt{x^2 + y^2}}\right)$$

After the contribution of each panel column 22 in each beam is computed, the complex, weighted measurements are summed to generate the simulated azimuth and elevation beam responses. Both azimuth and elevation beam responses are simulated in a programmable interval, which may typically but not necessarily be a 0.1 degree programmable increment.

The azimuth monopulse ratios can be determined from the simulated sum and difference beams by dividing the complex delta pattern by the complex sum pattern for the upper and lower channels. The elevation monopulse pattern is determined by subtracting the simulated magnitude of the lower sum from the magnitude of the upper sum.

To summarize, a contribution of each antenna panel column 22 is calculated by multiplying the antenna panel column 22 response (at each azimuth and elevation angle) by the amplitude and phase weights measured in an electronics cylinder 26. The amplitude and phase weight will be a function of the connector 22c (i.e., and including also reference numeral 26a in FIG. 11 and reference numeral 43 in FIG. 15 if used) that the antenna panel column 22 is connected to as well as the beam number being simulated since each antenna panel column 22 will appear in a different "position" for 8 different azimuth beams it is a part of. In addition to the antenna panel column 22 and electronics cylinder 26 measured data being multiplied together, a simulation of the radar apparatus 10 receive geometry must also be included to account for the cylindrical nature of the radar apparatus 10 antenna 12 and the relative position of each antenna panel column 22 element.

Once the contribution of each antenna panel column 22 in each receive beam is computed, the complex, weighted measurements are summed to form the complete azimuth and elevation beam response in accordance with reference numeral 70 in FIG. 24. Shown in FIG. 26 and FIG. 27 are examples of notional calculated (i.e., simulated) sum (i.e., FIG. 26) and delta (i.e., FIG. 27) beams patterns.

Figure 28:
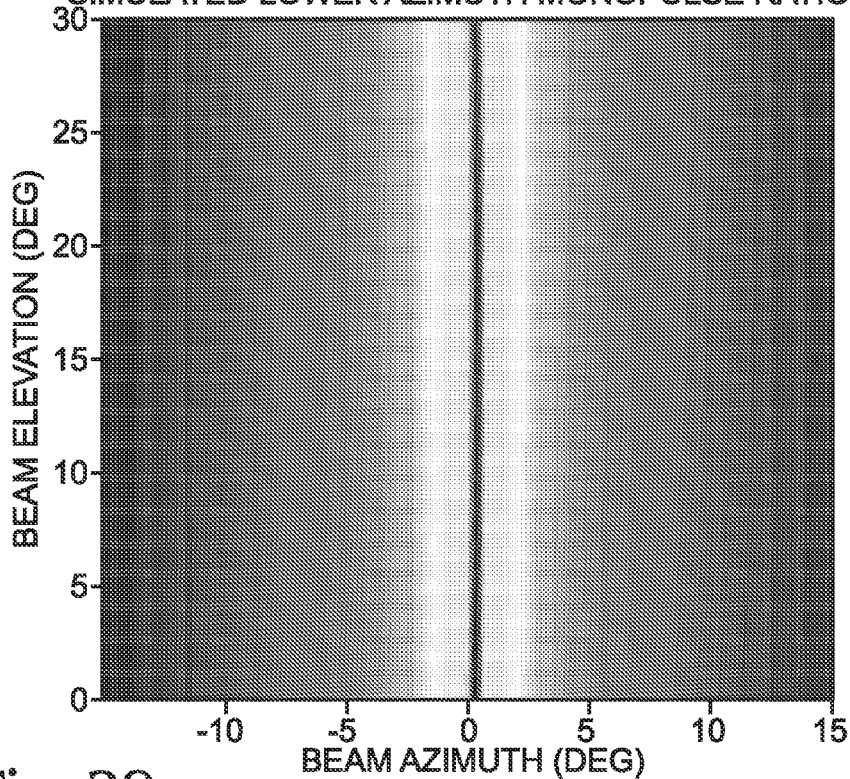
FIG. 28 is a simulation of a lower azimuth monopulse ratio according to the embodiments.
Figure 29:
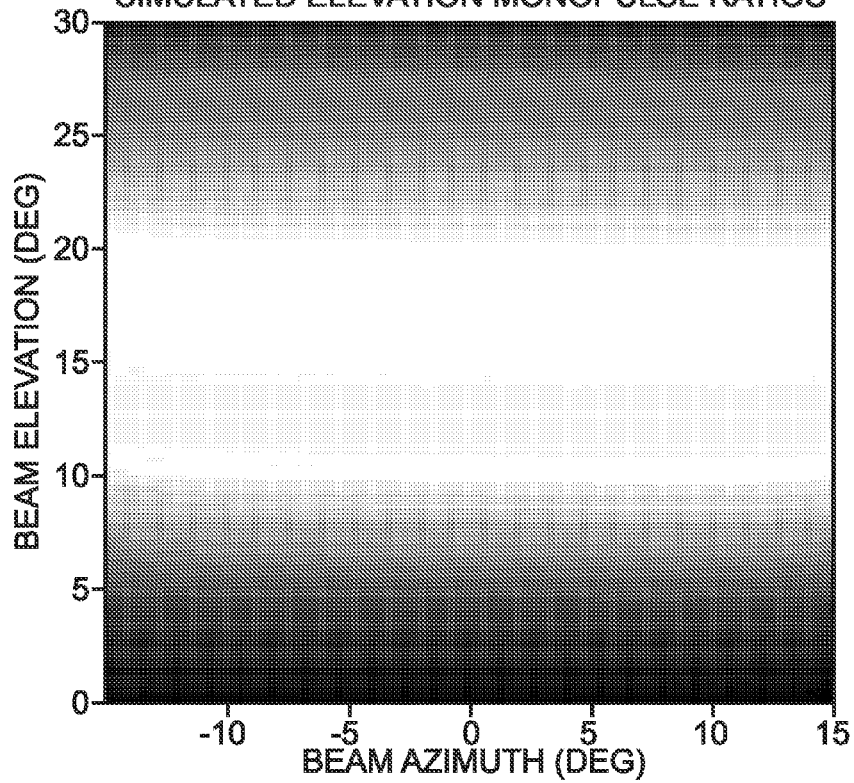
FIG. 29 is a simulation of an elevation monopulse ratio according to the embodiments.

Once the sum and delta beams have been simulated with measured data from a particular set of antenna panel columns 22 and a particular electronics cylinder 26, the monopulse ratio can be calculated in accordance with reference numeral 72 in FIG. 24. The azimuth monopulse ratios are computed by dividing the delta pattern by the sum pattern for the upper and lower channels. The elevation monopulse ratio is determined by subtracting the magnitude of the upper sum pattern by the magnitude of the lower sum pattern. Examples of the predicted simulated azimuth and elevation monopulse ratios are illustrated in FIG. 28 (i.e., azimuth monopulse ratio) and FIG. 29 (i.e., elevation monopulse ratio).

The inventive system and method intended to implement the foregoing measurement and calculations necessary to calculate the foregoing monopulse ratios must then convert those monopulse ratios into a useful set of look-up tables that the radar apparatus 10 can read during operation in accordance with reference numeral 74 of FIG. 24.

The look-up tables contain the results of the monopulse processing simulation. These tables are stored in the radar apparatus 10 and contain a list of elevation and azimuth angle offsets for all of the possible azimuth and elevation magnitude ratios. The indexing limits of the table are defined by the minimum and maximum ratios observed during beam simulation. To generate this table, the simulation will loop over all of the possible elevation ratio magnitudes. For each possible elevation ratio, it will loop over the list of possible azimuth ratio magnitudes that can be generated at that elevation ratio magnitude. At each intersection of elevation and azimuth monopulse ratio, the simulation will write four values; left azimuth, left elevation, right azimuth, and right elevation. If a valid elevation/azimuth ratio pair was not computed during the simulation, a set of placeholders will be entered into the table in the appropriate location. These placeholders will indicate to the radar apparatus 10 that the received elevation/azimuth ratio pair is not valid and the received target location should not be considered. The radar apparatus 10 will only use one pair of the four entries from the table for a given elevation/azimuth magnitude ratio at a time.

When the radar apparatus 10 indexes into the table for each pair of received elevation/azimuth monopulse ratios and reads out the four possible angle offsets, it will use the received phase to determine if the left or right angles should be used. If the received phase is greater than 90 degrees, it will use the left angle offsets. If the received phase is less than −90 degrees, it will use the right angle offsets. The radar apparatus 10 determines an azimuth and elevation angle for the detection under test.

The calibration data files are binary files of the following format:

The data contains "n" rows of "m" columns of azimuth/elevation data

All data points are 16-bit unsigned integers, scaled to values between 1 and 65535. The scale factors read in from the header file are used to convert this to the actual azimuths and elevations. Zero represents an invalid data point.

Each column of data consists of 4 data values: left azimuth absolute relative to beam center, left elevation relative to the plane upon which the radar apparatus is assembled (i.e., typically but not necessarily the horizon), right azimuth absolute relative to beam center, right elevation relative to the plane upon which the radar apparatus is assembled (i.e., typically but not necessarily the horizon).

From a correlation of: (1) a measured radar apparatus 10 response that yields an observed monopulse ratio when operating a fully assembled radar apparatus 10; with (2) a reading of the look-up tables, a "true" location of a target within a field may be determined in accordance with reference numeral 76 of FIG. 24.

During operation, the radar apparatus 10 will detect targets (i.e., a measured response) and compute a monopulse ratio for that target in azimuth and elevation. It is possible for the azimuth and elevation ratios to separately point to several locations on the monopulse ratio plots above. Selection of a particular monopulse ratio location as a "true" location of a target is resolved with a novel contouring operation that looks for intersections of a series of possible azimuth and elevation locations. FIG. 30 shows such a series of possible azimuth locations for a given azimuth monopulse ratio and a series of possible elevation locations for a given elevation monopulse ratio. The only two possible locations for the real "true" radar target would be the two intersections of these lines. The radar apparatus 10 would be able to determine which one of these two possible locations is the actual location of the target based Calibration Header:

| Field Name | Field Size (bits) | Data Type | Units | Description |
| --- | --- | --- | --- | --- |
| scale_min_az | 32 | Float | Deg | minimum azimuth represented by 1 in data |
| scale_max_az | 32 | Float | Deg | maximum azimuth represented by 65535 in data |
| scale_min_el | 32 | Float | Deg | minimum elevation represented by 1 in data |
| scale_max_el | 32 | Float | Deg | maximum elevation represented by 65535 in data |
| min_el_ratio | 16 | unsigned int | dB | minimum elevation ratio (row) indexed in table == elevation ratio for first row in table. Number of dB ticks down from zero that the elevation beam ratios start. |
| elev_incr | 8 | unsigned int | dB | delta elevation between each row of data. Table supplies number of ticks: n = 8 → 3/8; n = 16 → 3/16 |
| num_el_pts | 16 | unsigned int | N/A | number of rows (elevation ratios) in table |
| min_az_ratio | 16 | unsigned int | dB | minimum azimuth ratio (column) indexed in table == azimuth ratio for first column in table. Number of dB ticks down from zero that the azimuth beam ratios start. |
| az_incr | 8 | unsigned int | dB | delta azimuth between each column of data. Table supplies number of binary ticks. If n = 8, tick = 3/8 dB. If n = 16, tick = 3/16 dB. |
| num_az_pts | 16 | unsigned int | N/A | number of sets of columns (azimuth ratios) in table; each set has 4 values |

The data portion of the calibration file adheres to the following format:

on the phase information of the target return in accordance with reference numeral 78 of FIG. 24.

The phase determination in azimuth is determined by calculating the phase of the detected target in the sum beam and calculating the phase of the detected target in the difference beam. The phase of the monopulse ratio is computed as the phase of the vector subtraction of the detected signal from the sum beam minus the vector of the detected signal in the difference beam. If the phase of the difference between these two signals is greater than 90 degrees, the "true" target location would be on the left of the monopulse beam null. If the phase of the difference between these two signals is less than −90 degrees, the "true" target location would be on the right of the monopulse beam null. The angular distance from the beam null of the "true" target location would be represented by the value of the monopulse table where the left or right (depending on phase described above) vertical line intersects the mostly horizontal line shown in FIG. 30.

In common operation of the embodiments, the calibration utility 64 would write a list that contains the estimated azimuth and elevation locations of a radar target based on all possible azimuth and elevation monopulse ratios.

In summary, the inventive method provides a novel radar calibration and operation method that allows the radar apparatus 10, (or an alternative radar apparatus) to be calibrated and operated predicated on piecewise measurements of analog components (i.e., including but not limited to electronics cylinder 26 and antenna panel columns 22) of the radar apparatus 10. The particular methodology in accordance with the embodiments uses these measurements to predict and simulate the antenna beam patterns and determine what azimuth and elevation angle location a particular target is found based on the target's measured azimuth and elevation monopulse ratio. The embodiments utilize an algorithm that is unique in that it can easily predict an antenna beam pattern when any set of components is replaced without ever having to measure the behavior of the entire (assembled) radar apparatus.

While the foregoing embodiments describe the invention within the context of a series of methodological process steps, it is understood that the embodiments also include a computer assisted radar apparatus system that includes the laptop computer 16 (or an alternative computer) for purposes of temporarily storing the collected calibration data, generating simulations and effecting correlations in accordance with the embodiments. In that regard, the embodiments may utilize any of several types of computer apparatus or computer systems to assist with the invention and operative embodiments thereof.

Finally, the embodiments also contemplate that aspects of the embodiments and invention may be embodied within the context of a computer program product (i.e., such as but not limited to a software product) that may be encoded within any of several tangible media and provide for operative operational methodological process steps in accordance with the embodiments.

The embodiments of the invention are illustrative of the invention rather than limiting of the invention. Revisions and modifications may be made to methods, materials, structures, apparatus and dimensions in accordance with the embodiments, while still providing a method for calibrating and operating a radar apparatus, and a related system and computer program product in accordance with the invention, further in accordance with the accompanying claims.

What is claimed is:

1. A method for operating a radar apparatus comprising:
   determining for a plurality of radar components a plurality of laboratory test electrical responses;
   determining from the plurality of laboratory test electrical responses a simulated radar response for an assembled radar apparatus assembled from the plurality of radar components;
   assembling the plurality of radar components to provide the assembled radar apparatus; and
   determining the location of a target by correlating a measured response of the assembled radar apparatus with the simulated radar response.

2. The method of claim 1 wherein the determining the simulated radar response uses the rotational matrix and translation:

$$[x\ y\ z] = [Tx\ Ty\ Tz] \begin{bmatrix} \cos(\phi)\cos(\theta) & -\cos(\phi)\sin(\theta) & \sin(\phi) \\ \sin(\theta) & \cos(\theta) & 0 \\ -\sin(\phi)\cos(\theta) & \sin(\phi)\sin(\theta) & \cos(\phi) \end{bmatrix} - [Rx\ Ry\ Rz]$$

where: T is a location of a simulated target (in x,y,z coordinates);
R is a location of a simulated antenna column (in x,y,z coordinates);
$\phi$ is a simulated elevation of the target within an assembled radar apparatus beamspace; and
$\theta$ is a simulated azimuth of the target within the assembled radar apparatus beamspace, to resolve an actual azimuth of the simulated target and an actual elevation of the simulated target relative to the center of the simulated antenna column via:

$$az = \tan^{-1}\left(\frac{y}{x}\right)$$

$$el = \tan^{-1}\left(\frac{z}{\sqrt{x^2 + y^2}}\right)$$

where az is the actual azimuth of the target and el is the actual elevation of the target relative to the center of the simulated antenna column.

3. The method of claim 1 wherein the determining the simulated radar response includes:
   applying an amplitude and phase weight from a radar cylinder electrical response to a far field azimuth and elevation pattern for each of a plurality of radar column electrical responses;
   determining simulated sum and delta beams for the radar apparatus assembled geometry from the complete azimuth and elevation beam response;
   determining simulated monopulse ratios from the simulated sum and delta beams; and
   converting the simulated monopulse ratios to a look-up table.

4. The method of claim 3 wherein the correlating the measured response of the assembled apparatus with the simulated radar response utilizes the look-up table of simulated monopulse ratios.

5. The method of claim 1 wherein the determining the location of the target involves selection from two or less possible target locations predicated upon a phase ratio of the measured response.

6. A method for operating a radar apparatus comprising:
   determining a radar cylinder electrical response for an individual radar cylinder in a test fixture;

determining a plurality of radar column electrical responses for each of a plurality of individual radar columns in a test fixture;

determining from the radar cylinder electrical response and the plurality of radar column electrical responses a simulated radar response for an assembled radar apparatus assembled from the radar cylinder and the plurality of radar columns;

assembling the individual radar column and the plurality of radar columns to provide the assembled radar apparatus; and determining the location of a target by correlating a measured response of the assembled radar apparatus with the simulated radar response.

7. The method of claim 6 wherein the determining the radar cylinder electrical response includes determining amplitude and phase weights of the radar cylinder for each of the plurality of radar columns and their positions in the cylinder and individual beams.

8. The method of claim 7 wherein the determining the plurality of radar column electrical responses includes determining far field azimuth and elevation patterns for each of the plurality of radar columns.

9. The method of claim 6 wherein the determining the simulated radar response uses the rotational matrix and translation:

$$[x \ y \ z] = [Tx \ Ty \ Tz] \begin{bmatrix} \cos(\phi)\cos(\theta) & -\cos(\phi)\sin(\theta) & \sin(\phi) \\ \sin(\theta) & \cos(\theta) & 0 \\ -\sin(\phi)\cos(\theta) & \sin(\phi)\sin(\theta) & \cos(\phi) \end{bmatrix} - [Rx \ Ry \ Rz]$$

where: T is a location of a simulated target (in x,y,z coordinates);

R is a location of a simulated antenna column (in x,y,z coordinates);

φ is a simulated elevation of the target within an assembled radar apparatus beamspace; and θ is a simulated azimuth of the target within the assembled radar apparatus beamspace, to resolve an actual azimuth of the simulated target and an actual elevation of the simulated target relative to the center of the simulated antenna column via:

$$az = \tan^{-1}\left(\frac{y}{x}\right)$$
$$el = \tan^{-1}\left(\frac{z}{\sqrt{x^2 + y^2}}\right)$$

where az is the actual azimuth of the target and el is the actual elevation of the target relative to the center of the simulated antenna column.

10. The method of claim 9 wherein the determining the simulated radar response for the radar apparatus includes:

applying the amplitude and phase weights from the radar cylinder electrical response to the far field azimuth and elevation patterns for each of the radar column electrical responses;

determining simulated sum and delta beams for the radar apparatus assembled geometry from the complete azimuth and elevation beam response;

determining simulated monopulse ratios from the simulated sum and delta beams; and converting the simulated monopulse ratios to a look-up table and phase ratios.

11. The method of claim 10 wherein the correlating the actual response with the simulated radar response correlates measured monopulse ratios to the look-up table.

12. The method of claim 6 wherein the determining the location of the target includes selecting a particular target location from a plurality of possible simulated target locations predicated upon a phase of the measured response.

13. A radar system comprising:

a radar apparatus comprising a plurality of components; and a computer programmed to:

receive for the plurality of components a plurality of laboratory test electrical responses;

determine from the plurality of laboratory test electrical responses a simulated radar response for an assembled radar apparatus assembled from the plurality of radar components; and determine the location of a target by correlating a measured response of the assembled radar apparatus with the simulated radar response.

14. The radar system of claim 13 wherein the determining the simulated radar response uses the rotational matrix and translation:

$$[x \ y \ z] = [Tx \ Ty \ Tz] \begin{bmatrix} \cos(\phi)\cos(\theta) & -\cos(\phi)\sin(\theta) & \sin(\phi) \\ \sin(\theta) & \cos(\theta) & 0 \\ -\sin(\phi)\cos(\theta) & \sin(\phi)\sin(\theta) & \cos(\phi) \end{bmatrix} - [Rx \ Ry \ Rz]$$

where: T is a location of a simulated target (in x,y,z coordinates);

R is a location of a simulated antenna column (in x,y,z coordinates);

φ is a simulated elevation of the target within an assembled radar apparatus beamspace; and θ is a simulated azimuth of the target within the assembled radar apparatus beamspace, to resolve an actual azimuth of the simulated target and an actual elevation of the simulated target relative to the center of the simulated antenna column via:

$$az = \tan^{-1}\left(\frac{y}{x}\right)$$
$$el = \tan^{-1}\left(\frac{z}{\sqrt{x^2 + y^2}}\right)$$

where az is the actual azimuth of the target and el is the actual elevation of the target relative to the center of the simulated antenna column.

15. The radar system of claim 14 wherein the determining of the simulated radar response for the radar apparatus includes:

applying the amplitude and phase weights from a radar cylinder electrical response to a plurality of far field azimuth and elevation patterns for each of a plurality of radar column electrical responses;

determining simulated sum and delta beams for the radar apparatus assembled geometry from the complete azimuth and elevation beam response;

determining simulated monopulse ratios from the simulated sum and delta beams; and converting the simulated monopulse ratios to a look-up table.

16. The radar apparatus of claim 15 wherein the correlating the measured response of the assembled radar apparatus with the simulated radar response utilizes the look-up table of simulated monopulse ratios.

17. The radar apparatus of claim 13 wherein the determining the location of the target involves selection from a plurality of possible target locations predicated upon a phase of the measured response.

18. A non-transitory computer readable medium having instructions stored thereon which, when executed by at least one processor cause a computer to:
  receive for a plurality of radar components a plurality of laboratory test electrical responses;
  determine from the plurality of laboratory test electrical responses a simulated radar response for an assembled radar apparatus assembled from the plurality of radar components; and
  determine the location of a target by correlating a measured response of the assembled radar apparatus with the simulated radar response.

19. The non-transitory computer readable medium of claim 18 wherein the determining the simulated radar response uses the rotational matrix and translation:

$$[x \ y \ z] = [Tx \ Ty \ Tz] \begin{bmatrix} \cos(\phi)\cos(\theta) & -\cos(\phi)\sin(\theta) & \sin(\phi) \\ \sin(\theta) & \cos(\theta) & 0 \\ -\sin(\phi)\cos(\theta) & \sin(\phi)\sin(\theta) & \cos(\phi) \end{bmatrix} - [Rx \ Ry \ Rz]$$

where: T is a location of a simulated target (in x,y,z coordinates);
  R is a location of a simulated antenna column (in x,y,z coordinates);
  $\phi$ is a simulated elevation of the target within an assembled radar apparatus beamspace; and
  $\theta$ is a simulated azimuth of the target within the assembled radar apparatus beamspace, to resolve an actual azimuth of the simulated target and an actual elevation of the simulated target relative to the center of the simulated antenna column via:

$$az = \tan^{-1}\left(\frac{y}{x}\right)$$

$$el = \tan^{-1}\left(\frac{z}{\sqrt{x^2 + y^2}}\right)$$

where az is the actual azimuth of the target and el is the actual elevation of the target relative to the center of the simulated antenna column.

20. The non-transitory computer readable medium of claim 19 wherein the determining the simulated radar response for the radar apparatus includes:
  applying the amplitude and phase weights from a radar cylinder electrical response to a plurality of far field azimuth and elevation patterns for each of a plurality of radar column electrical responses;
  determining simulated sum and delta beams for the radar apparatus assembled geometry from the complete azimuth and elevation beam response;
  determining simulated monopulse ratios from the simulated sum and delta beams; and
  converting the simulated monopulse ratios to a look-up table.

21. The non-transitory computer readable medium of claim 20 wherein the correlating the measured response of the assembled apparatus with the simulated radar response utilizes the look-up table of simulated monopulse ratios.

22. The non-transitory computer readable medium of claim 18 wherein the determining the location of the target involves selection from a plurality of possible target locations predicated upon a phase of the measured response.

* * * * *